(12) United States Patent
Kawakatsu et al.

(10) Patent No.: US 10,964,137 B2
(45) Date of Patent: Mar. 30, 2021

(54) RISK INFORMATION COLLECTION DEVICE MOUNTED ON A VEHICLE

(71) Applicant: Mitsubishi Electric Corporation, Chiyoda-ku (JP)

(72) Inventors: Kazuyo Kawakatsu, Tokyo (JP); Yoshihisa Yamaguchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/603,627

(22) PCT Filed: Apr. 13, 2018

(86) PCT No.: PCT/JP2018/015515
§ 371 (c)(1),
(2) Date: Oct. 8, 2019

(87) PCT Pub. No.: WO2018/235409
PCT Pub. Date: Dec. 27, 2018

(65) Prior Publication Data
US 2020/0118360 A1      Apr. 16, 2020

(30) Foreign Application Priority Data

Jun. 22, 2017   (JP) .............................. JP2017-121910

(51) Int. Cl.
*G06F 3/01*       (2006.01)
*G06K 9/00*      (2006.01)
(Continued)

(52) U.S. Cl.
CPC ............. *G07C 5/085* (2013.01); *G06F 3/013* (2013.01); *G06K 9/00845* (2013.01);
(Continued)

(58) Field of Classification Search
None
See application file for complete search history.

(56) References Cited

U.S. PATENT DOCUMENTS 10,373,500 B1 * 8/2019 Chan ................. G06K 9/00845
2007/0032929 A1    2/2007 Yoshioka et al.
(Continued)

FOREIGN PATENT DOCUMENTS

JP       2003-123185 A      4/2003
JP       2005-293479 A     10/2005
(Continued)

OTHER PUBLICATIONS

International Search Report dated Jun. 12, 2018 in PCT/JP2018/015515 filed Apr. 13, 2018.

*Primary Examiner* — Tahmina N Ansari
(74) *Attorney, Agent, or Firm* — Xsensus LLP

(57) ABSTRACT

The present invention relates to a risk information collection device which includes: a degree of risk calculator to calculate a degree of risk of a travel state of the vehicle based on travel information of the vehicle, a visually-recognized object specifier to combine visual line information of a driver of the vehicle and object information around the vehicle and specify a name of a visually-recognized object of the driver to set a visually-recognized object candidate, a passenger information acquirer to acquire passenger information including at least words pronounced by a passenger, a risk-inducing factor candidate setter to set a risk-inducing factor candidate for specifying a risk-inducing factor based on the passenger information, and a risk-inducing factor specifier to specify a risk-inducing factor based on the degree of risk, the visually-recognized object candidate, and the risk-inducing factor candidate.

10 Claims, 24 Drawing Sheets

(51) Int. Cl.
*G07C 5/08* (2006.01)
*G07C 5/00* (2006.01)
*G10L 15/04* (2013.01)
*G10L 15/22* (2006.01)

(52) U.S. Cl.
CPC .............. *G07C 5/008* (2013.01); *G10L 15/04* (2013.01); *G10L 15/22* (2013.01)

(56) References Cited

U.S. PATENT DOCUMENTS

2008/0004806 A1* 1/2008 Kimura ................. B60W 50/16
 701/301
2014/0278586 A1* 9/2014 Sanchez ................. G06Q 40/00
 705/4

FOREIGN PATENT DOCUMENTS

| | | |
|---|---|---|
| JP | 2007-47914 A | 2/2007 |
| JP | 2011-113244 A | 6/2011 |
| WO | WO 2016/030934 A1 | 3/2016 |

\* cited by examiner

F I G. 5

| DEGREE OF RISK | TRAVEL INFORMATION |
|---|---|
| 1 | SPEED IS LOW (LEGAL SPEED −10km/h) + HARD BRAKING+ ACCELERATION IS SMALL+ CHANGE OF STEERING ANGLE IS SMALL |
| 2 | SPEED IS LOW (LEGAL SPEED −10km/h) + HARD BRAKING+ ACCELERATION IS SMALL+ CHANGE OF STEERING ANGLE IS LARGE |
| 3 | SPEED IS LOW (LEGAL SPEED −10km/h) + HARD BRAKING+ ACCELERATION IS LARGE+ CHANGE OF STEERING ANGLE IS SMALL |
| 4 | SPEED IS LOW (LEGAL SPEED −10km/h) + HARD BRAKING+ ACCELERATION IS LARGE+ CHANGE OF STEERING ANGLE IS LARGE |
| 5 | SPEED IS EQUIVALENT TO LEGAL SPEED (EQUAL TO OR SMALLER THAN LEGAL SPEED AND EQUAL TO OR LARGER THAN (LEGAL SPEED −10km/h)+ HARD BRAKING+ ACCELERATION IS SMALL+ CHANGE OF STEERING ANGLE IS SMALL |
| 6 | SPEED IS EQUIVALENT TO LEGAL SPEED (EQUAL TO OR SMALLER THAN LEGAL SPEED AND EQUAL TO OR LARGER THAN (LEGAL SPEED −10km/h)+ HARD BRAKING+ ACCELERATION IS SMALL+ CHANGE OF STEERING ANGLE IS LARGE |
| 7 | SPEED IS EQUIVALENT TO LEGAL SPEED (EQUAL TO OR SMALLER THAN LEGAL SPEED AND EQUAL TO OR LARGER THAN (LEGAL SPEED −10km/h)+ HARD BRAKING+ ACCELERATION IS LARGE+ CHANGE OF STEERING ANGLE IS SMALL |
| 8 | SPEED IS EQUIVALENT TO LEGAL SPEED (EQUAL TO OR SMALLER THAN LEGAL SPEED AND EQUAL TO OR LARGER THAN (LEGAL SPEED −10km/h)+ HARD BRAKING+ ACCELERATION IS LARGE+ CHANGE OF STEERING ANGLE IS LARGE |
| 9 | SPEED IS HIGH (LEGAL SPEED +10km/h)+ HARD BRAKING+ ACCELERATION IS LARGE+ CHANGE OF STEERING ANGLE IS SMALL |
| 10 | SPEED IS HIGH (LEGAL SPEED +10km/h)+ HARD BRAKING+ ACCELERATION IS LARGE+ CHANGE OF STEERING ANGLE IS LARGE |

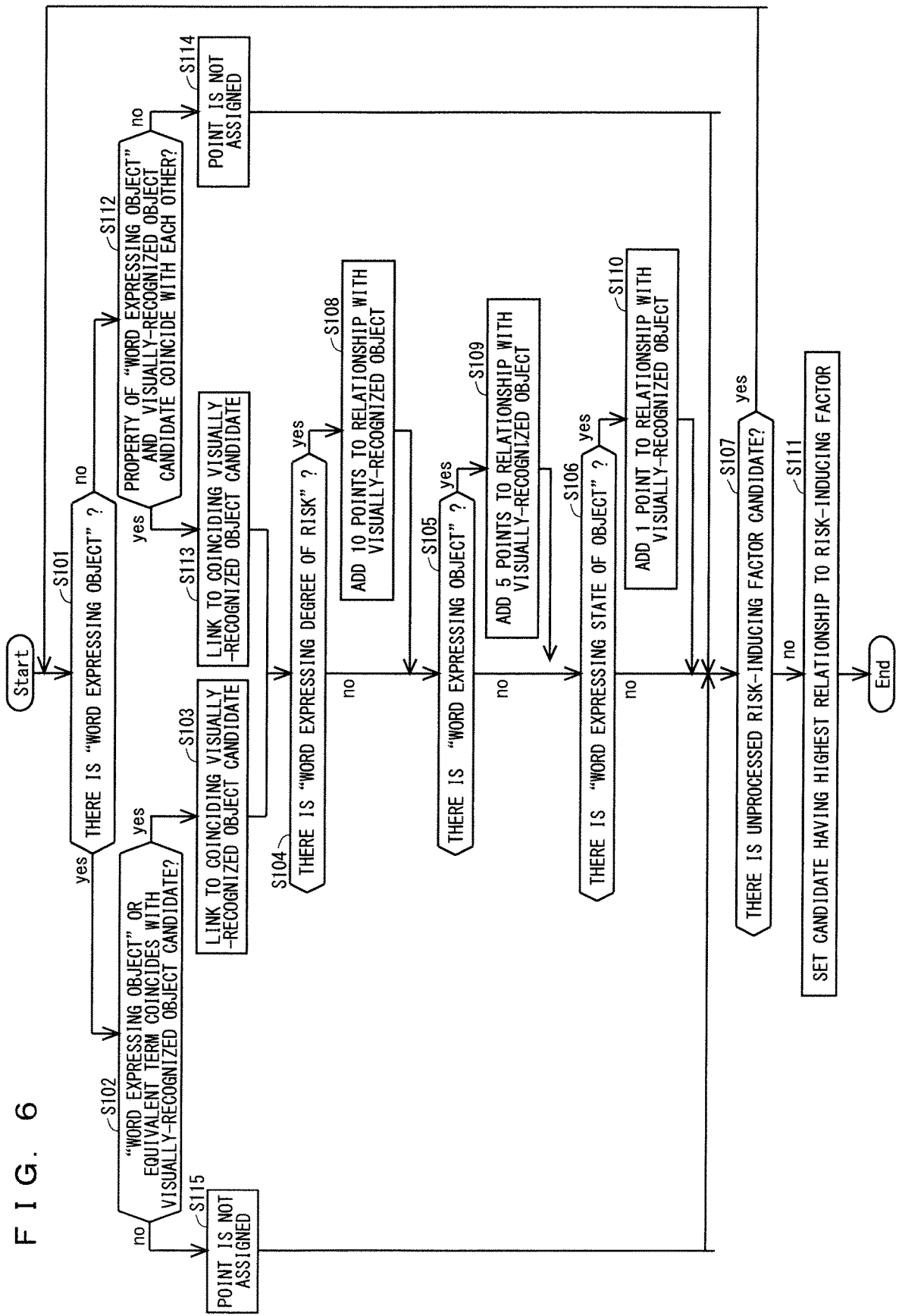
F I G. 6

F I G. 1 2
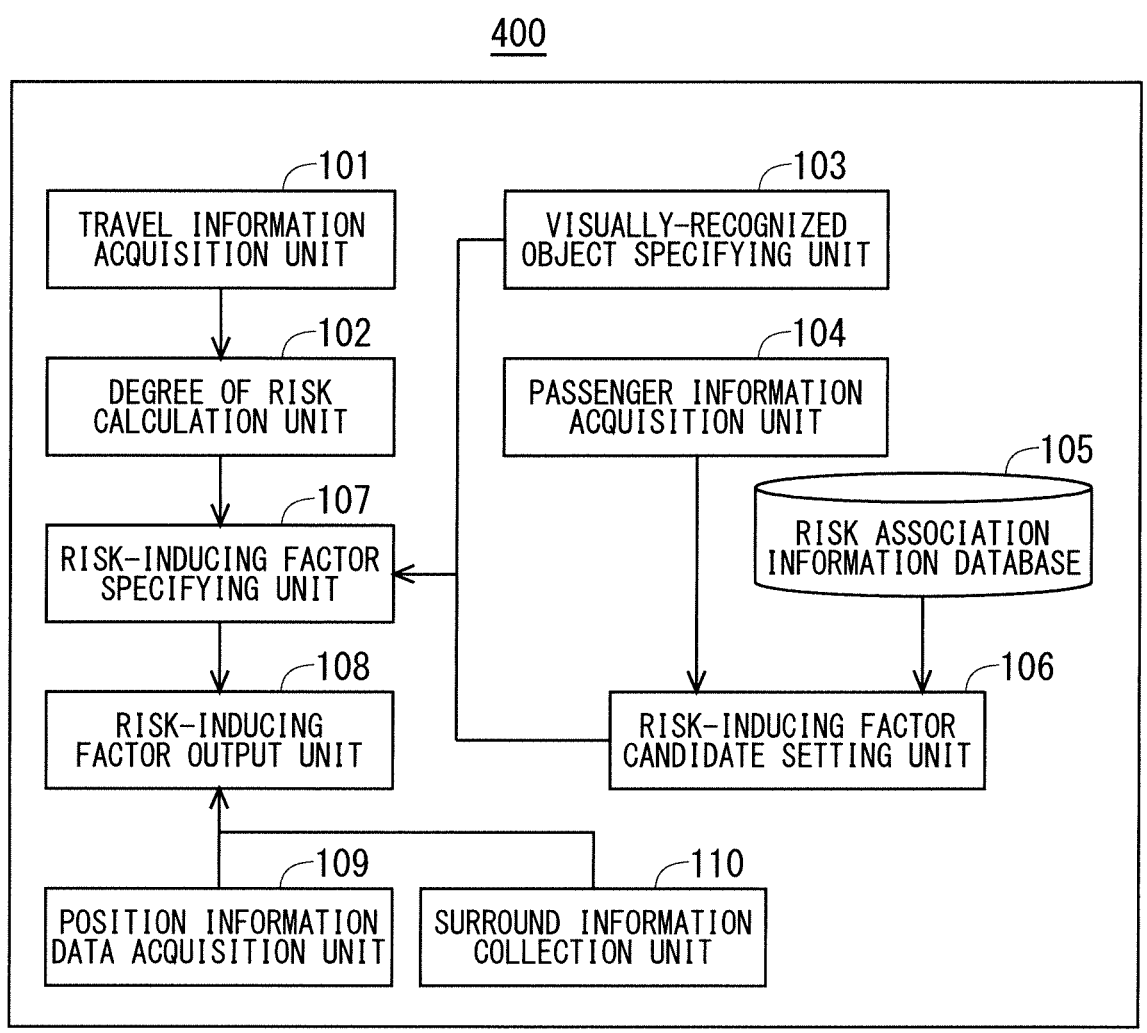

FIG. 14

| TIME | VEHICLE ID | RISK-INDUCING FACTOR | POSITION INFORMATION |
|---|---|---|---|
| 2018/2/28 9:30 | AB11244523 | CAT | LATITUDE (38.41258), LONGITUDE (3.17518) |
| 2018/3/1 19:00 | AB11244512 | BICYCLE | LATITUDE (38.41259), LONGITUDE (3.17519) |

F I G. 1 7
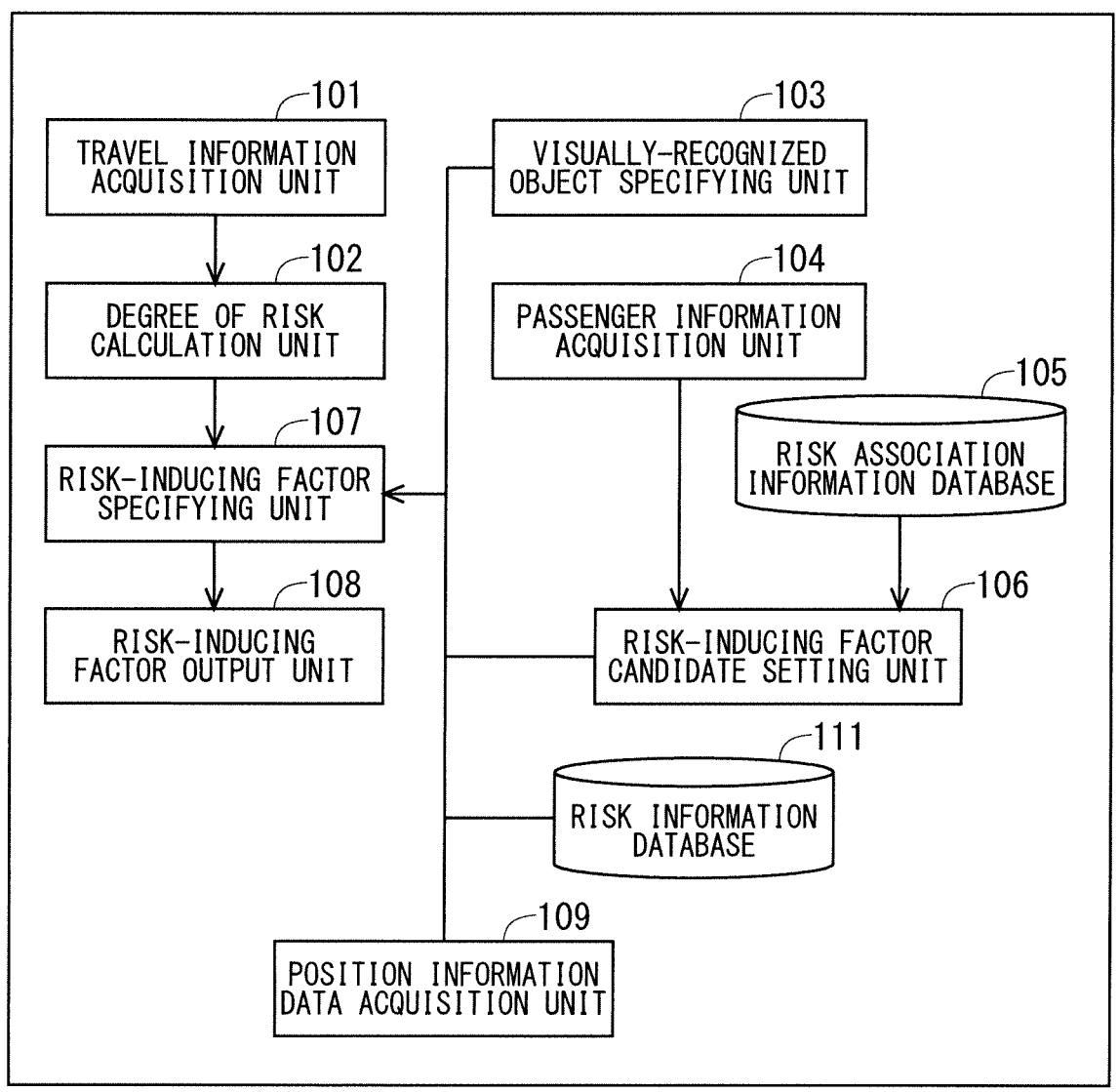

F I G. 2 1
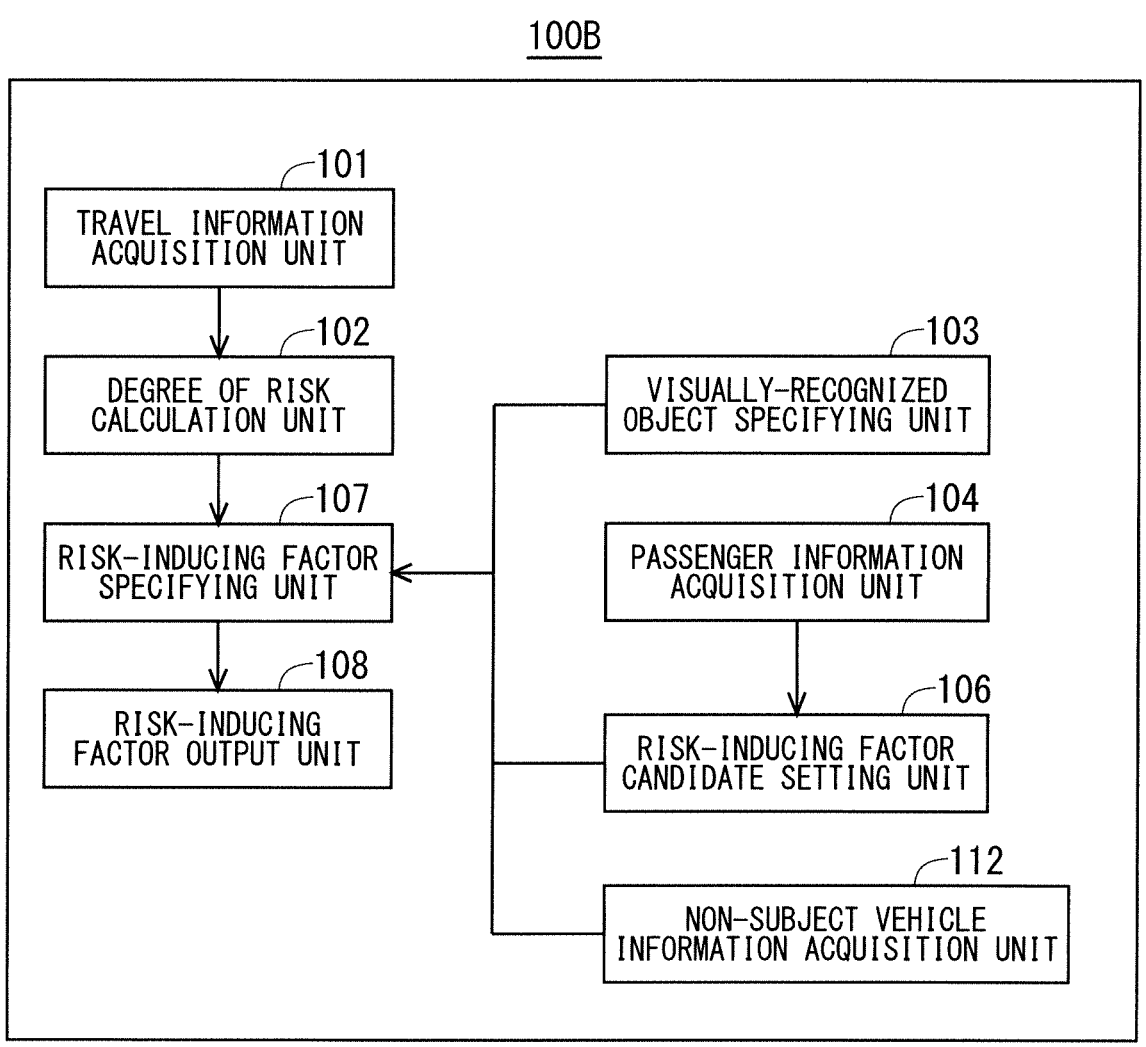

F I G. 2 5
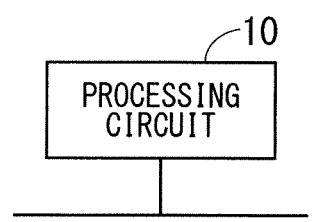
F I G. 2 6
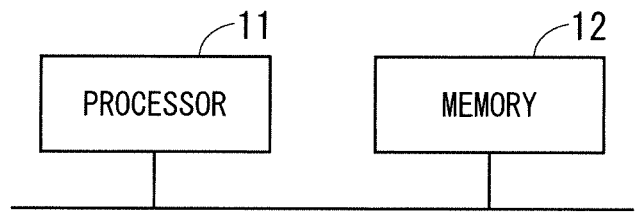

RISK INFORMATION COLLECTION DEVICE MOUNTED ON A VEHICLE

TECHNICAL FIELD

The present invention relates to a risk information collection device collecting risk information when a vehicle travels along a road.

BACKGROUND ART

A driver or a passenger feels "near miss", which is a scene in which the driver or the passenger feels a sense of danger directly linked to a traffic accident, in some cases when a vehicle travels along a road. There is an example of collecting and organizing information of "near miss", thereby creating a map indicating an area inducing the traffic accident, and sharing the map for use in preventing the traffic accident. However, questionnaires are conventionally used for collecting the information of "near miss", so that it takes effort and time to organize and input a result of the questionnaires. Thus, Patent Documents 1 and 2 propose a system of automatically collecting the information of "near miss" from travel information.

PRIOR ART DOCUMENTS

Patent Documents

Patent Document 1: Japanese Patent Application Laid-Open No. 2003-123185
Patent Document 2: Japanese Patent Application Laid-Open No. 2007-47914

SUMMARY

Problem to be Solved by the Invention

Patent Document 1 discloses a technique of determining whether or not a driver is in danger based on an output from an inter-vehicle distance sensor, a pulsation sensor for the driver, and a sensor such as a voice microphone for acquiring a state of a vehicle, for example, automatically determining a type of risk based on a result thereof, specifying a dangerous spot, and reflecting it in map data. However, a factor of inducing a risk cannot be specified by this method.

Patent Document 2 discloses a technique of determining which direction a visual line of a driver is directed to and specifying a dangerous object depending on whether or not an object candidate which has caused a state of near miss is located in the direction of the visual line. However, there may be a plurality of object candidates in this method, so that a factor of inducing a risk cannot be specified.

The present invention therefore has been made to solve problems as described above, and it is an object of the present invention to provide a risk information collection device capable of specifying a risk-inducing factor of inducing a risk.

Means to Solve the Problem

A risk information collection device according to the present invention is a risk information collection device collecting information dangerous to a traveling of the vehicle, including: a processing circuit, wherein the processing circuit is configured to perform: travel information acquisition processing of acquiring travel information indicating a travel state of the vehicle; degree of risk calculation processing of calculating a degree of risk which is to be an index whether a travel state of the vehicle is in danger based on the travel information acquired in the travel information acquisition processing; visually-recognized object specifying processing of combining visual line information of a driver of the vehicle and object information around the vehicle and specifying a visually-recognized object of the driver to set a visually-recognized object candidate; passenger information acquisition processing of acquiring passenger information including words pronounced by a passenger; risk-inducing factor candidate setting processing of setting a risk-inducing factor candidate for specifying a risk-inducing factor which has induced a risk based on the passenger information acquired in the passenger information acquisition processing; and risk-inducing factor specifying processing of specifying the risk-inducing factor based on the degree of risk calculated in the degree of risk calculation processing, the visually-recognized object candidate specified in the visually-recognized object specifying processing, and the risk-inducing factor candidate being set in the risk-inducing factor candidate setting processing. The risk-inducing factor specifying processing checks a relationship between the visually-recognized object candidate and the risk-inducing factor candidate when the degree of risk becomes equal to or larger than a threshold value, and specifies the risk-inducing factor candidate as the risk-inducing factor when the visually-recognized object candidate and the risk-inducing factor candidate are associated with each other, and the risk-inducing factor candidate setting processing performs voice analysis on words pronounced by the passenger, divides the words into single words, and sets a plurality of the words, which have been divided, as the risk-inducing factor candidate in one set.

Effects of the Invention

According to the risk information collection device in the present invention, the risk-inducing factor can be specified.

BRIEF DESCRIPTION OF DRAWINGS

FIG. 5 A drawing describing an example of expressing a degree of risk on a scale of one to ten.

FIG. 6 A flow chart describing a procedure of checking a relationship between a visually-recognized object candidate group and a risk-inducing factor candidate group.

FIG. 12 A function block diagram illustrating a configuration of a risk information collection device according to an embodiment 4 of the present invention.

FIG. 14 A drawing describing an example of risk information.

FIG. 17 A function block diagram illustrating a modification example of the configuration of the risk information collection device according to the embodiment 2 of the present invention.

FIG. 21 A function block diagram illustrating a modification example of the configuration of the risk information collection device according to the embodiment 1 of the present invention.

FIG. 25 A block diagram illustrating a hardware configuration of the risk information collection device according to the present invention.

FIG. 26 A block diagram illustrating a hardware configuration of the risk information collection device according to the present invention.

DESCRIPTION OF EMBODIMENT(S)

Embodiment 1

Figure 1:
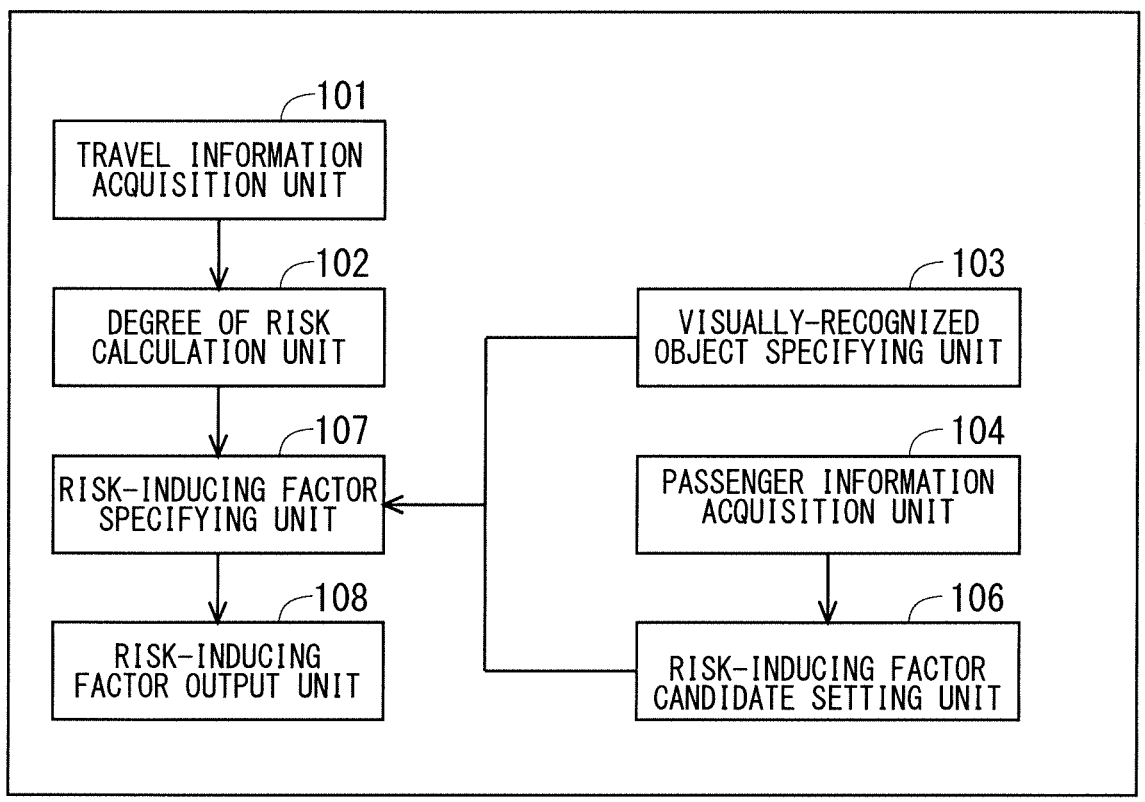
FIG. 1 A function block diagram illustrating a configuration of a risk information collection device according to an embodiment 1 of the present invention.

FIG. 1 is a function block diagram illustrating a configuration of a risk information collection device 100 according to an embodiment 1 of the present invention. As illustrated in FIG. 1, the risk information collection device 100 includes a travel information acquisition unit 101 acquiring travel information of a vehicle, a degree of risk calculation unit 102, a visually-recognized object specifying unit 103, a passenger information acquisition unit 104, a risk-inducing factor candidate setting unit 106, a risk-inducing factor specifying unit 107, and a risk-inducing factor output unit 108.

The travel information acquisition unit 101 acquires travel information which is a vehicle state amount indicating a travel state of a vehicle, and outputs the travel information to the degree of risk calculation unit 102. The travel information of the vehicle includes a speed, an acceleration, brake information, steering angle information, accelerator information, and engine information, for example. A plurality of sensors included in the vehicle detect the travel information, however, known methods are used for the detection, thus the description thereof is omitted.

The degree of risk calculation unit 102 calculates a degree of risk of the vehicle based on a degree of change of the travel information being output from the travel information acquisition unit 101 to set risk state information.

The visually-recognized object specifying unit 103 specifies a visually-recognized object of a driver, using viewpoint information of the driver and object information around the vehicle, and outputs the visually-recognized object as information of a visually-recognized object group to the risk-inducing factor specifying unit 107.

The viewpoint information of the driver is acquired using a visual line detection device. Examples of the visual line detection device include a device detecting a viewpoint using a camera and infrared light, and a wearable device detecting a visual line using muscle potential information around an eyeball, for example. It is also applicable to recognize eyes of the driver, using a camera taking a video in the vehicle and a video analysis function, to specify the viewpoint instead of the visual line detection device. The viewpoint information includes at least a start point position of the visual line and a direction of the visual line. The viewpoint information may additionally include information regarding eyes such as a position of a face or eyes of the driver, a direction of the face or black eyes, the number of eyewinks, a presence or absence of eye glasses of the driver or a contact lens attached to the driver's eye. Examples of a method of detecting the visual line include various methods such as a corneal reflection method, and a known optional method can be adopted in the present invention.

The object information around the vehicle is acquired using a camera mounted on the vehicle and a video analysis function. Adoptable as the camera mounted on the vehicle is a camera including a wide-angle lens capable of simultaneously taking a video of a front side and lateral side of a subject vehicle and a camera system synthesizing one video from videos in a plurality of directions taken by a plurality of cameras. A vehicle mounting the risk information collection device according to each embodiment is referred to as a subject vehicle and a vehicle other than the subject vehicle is referred to as a non-subject vehicle hereinafter. A risk information collection device similar to that in the subject vehicle is also mounted on the other vehicle, and information is transmitted and received between the risk information collection devices.

A video taken by a camera disposed outside the vehicle such as a road shoulder may be used. In this case, the video is transmitted from the camera disposed outside the vehicle to the risk information collection device 100 via a direct communication between the camera disposed outside the vehicle and the risk information collection device 100 or a cloud server, thus the video taken by the camera disposed outside the vehicle can be used. The object information around the vehicle may be acquired using a radar instead of the camera.

The object information includes information of at least a name, a relative position in relation to the subject vehicle, and a size, for example. The object information may additionally include a color and a shape, for example. For example, information of the object as it is seen such as "a black minivan, 4 meters in length, relative position (relative distance of 2 m, angle of 60° with respect to the vehicle)" can be included. In this case, the angle with the subject vehicle can be expressed by a clockwise direction with a traveling direction of the subject vehicle being set to 0°.

The object information is continuously acquired while the vehicle is traveling. A range of acquiring the object information is calculated based on a stopping distance at a time of hard braking on an assumption of a range with no trouble at the time of hard braking while the vehicle is traveling. For example, the range is set to approximately 60 m in diameter centering on the subject vehicle in a public highway and approximately 130 m in diameter in an express highway. The range may be changed depending on a speed.

Figure 2:
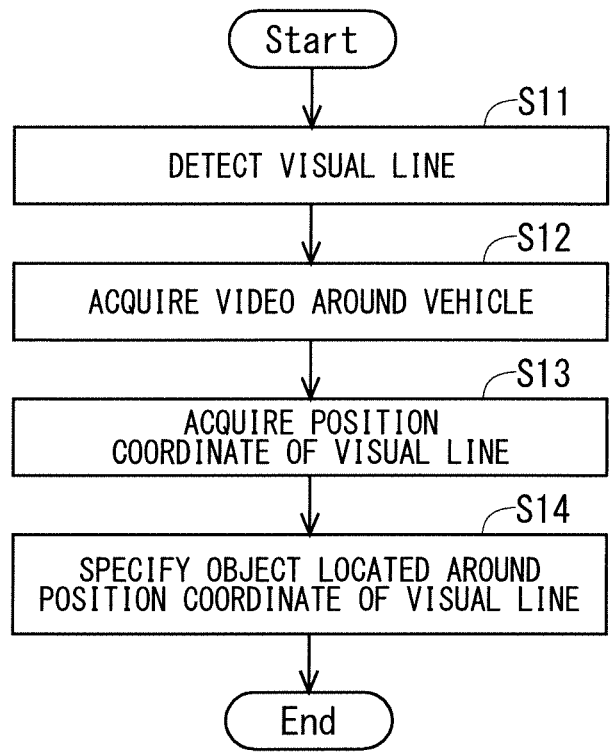
FIG. 2 A flow chart describing an operation of a visually-recognized object specifying unit in the risk information collection device according to the embodiment 1 of the present invention.

An example of processing in the visually-recognized object specifying unit 103 is described herein using a flow chart illustrated in FIG. 2. The risk information collection device 100 starts operating upon switching on an ignition switch of the vehicle, thus the visually-recognized object specifying unit 103 also starts visually-recognized object specifying processing, and the visually-recognized object specifying unit 103 firstly acquires the viewpoint information of the driver using the visual line detection device, for example (Step S11).

Next, the visually-recognized object specifying unit 103 acquires a video around the vehicle using an in-vehicle camera taking a video outside the vehicle, for example, (Step S12), converts a coordinate of the viewpoint of the driver acquired in Step S11 into a coordinate of the video around the vehicle, and acquires a position coordinate of the viewpoint on the video around the vehicle (Step S13). The conversion of the coordinate is processing of converting the position coordinate of the viewpoint calculated by the line detection device into a camera coordinate of the in-vehicle camera used in Step S11. The coordinate is converted in this manner, thereby being able to map the position coordinate of the viewpoint of the driver on the video around the vehicle. When the in-vehicle camera is used, the converted coordinate is uniquely defined in accordance with a position of the camera and a position of the visual line detection device, thus can be calibrated in advance.

Next, the object around the position coordinate of the viewpoint of the driver mapped on the video around the vehicle is detected. A known method such as a method using an image recognition, for example, can be used as a method of detecting the object, and the detected object is specified as the visually-recognized object (Step S14). The processing of Steps S11 to S14 described above is periodically repeated while the ignition switch of the vehicle is ON.

Described as a specific example of the visually-recognized object specifying processing described above is a case where the driver visually recognizes a black minivan located with the relative distance of 2 m at an angle of 60° with respect to the subject vehicle.

The visual line of the driver with the relative distance of 2 m at the angle 60° is detected in Step S11, the video around the vehicle at that time is acquired in Step S12, and the viewpoint position (the distance of 2 m from the subject vehicle and the angle of 60° with respect to the subject vehicle) is converted on the video around the vehicle in Step S13.

In Step S14, the object information in a viewpoint position (the distance of 2 m from the subject vehicle and the angle of 60° with respect to the subject vehicle) on the video around the vehicle is detected in Step S14, and it is specified that the visually-recognized object is the black minivan with a length of 4 m. The information of the specified visually-recognized object which is "a black minivan, 4 meters in length, relative position (relative distance of 2 m, angle of 60° with respect to the vehicle)" is stored in a predetermined storage device together with information of a time of detection. The predetermined storage device may be provided in the risk information collection device 100, however, it may be provided in the other position in the vehicle.

The passenger information acquisition unit 104 acquires passenger information and outputs it to the risk-inducing factor candidate setting unit 106. The passenger information includes voice information of words pronounced by the passenger, video information indicating a behavior of the passenger pointing to a specific object, and video information of an object to which the passenger points, for example.

An inside camera taking a video inside the vehicle, an in-vehicle camera taking a video outside the vehicle, a microphone, an accelerometer, and a gyro sensor can be used to acquire the passenger information. The accelerometer and the gyro sensor are held by the passenger or disposed on a seat or a seat belt so as to be used for acquiring a direction of a face and body of the passenger and a behavior thereof.

The risk-inducing factor candidate setting unit 106 analyzes the passenger information being output from the passenger information acquisition unit 104, and sets a risk-inducing factor candidate group to output it to the risk-inducing factor specifying unit 107.

Figure 3:
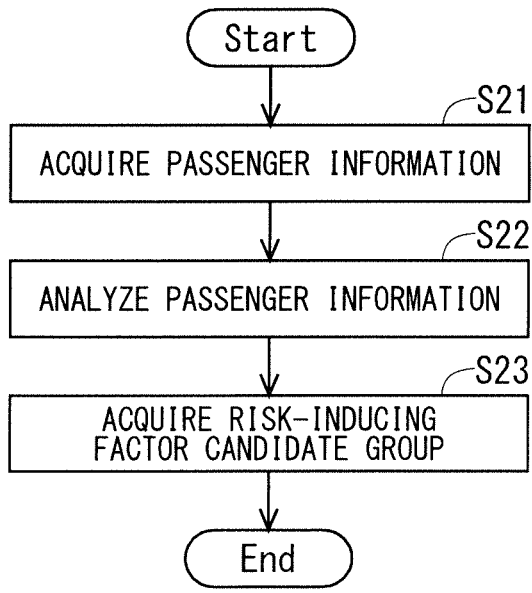
FIG. 3 A flow chart describing operations of a passenger information acquisition unit and a risk-inducing factor candidate setting unit in the risk information collection device according to the embodiment 1 of the present invention.

Processing in the passenger information acquisition unit 104 and the risk-inducing factor candidate setting unit 106 is described herein using a flow chart illustrated in FIG. 3.

The passenger information is acquired in the passenger information acquisition unit 104 (Step S21). The passenger information is provided to the risk-inducing factor candidate setting unit 106, and is analyzed in the risk-inducing factor candidate setting unit 106 (Step S22).

Voice analysis is performed on the words of the passenger by voice recognition as the analysis of the words pronounced by the passenger, and processing of dividing the voice into single words is performed. For example, when the voice information of "I would like to go to the park tomorrow." is acquired, the voice is divided into "tomorrow", "the park", "would like to go".

As the analysis of the behavior of the passenger, for example, when the passenger performs a behavior of pointing to a bicycle, the image analysis is performed on the video by image recognition to detect a pointing operation, and the bicycle to which the finger is directed is specified as the object. An example of the analysis of the object is described hereinafter.

For example, when the passenger performs a behavior of pointing to a bicycle in a case where a direction in which the passenger points is detected using the video information taken by an inside camera, a shape of a hand is determined by the image recognition on a video taken by an in-vehicle camera to detect the pointing operation, and a direction in which a finger extends is specified to detect the direction in which the passenger points. Then, a coordinate position of the direction in which the passenger points is converted into a coordinate on the video around the vehicle taken by the in-vehicle camera which takes a video outside the vehicle, and the bicycle located in that direction is recognized as a bicycle by a pattern matching, for example, and a name thereof is specified.

Examples of a method of detecting the direction in which the passenger points include a method of detecting a direction of a face or a direction of a body using an accelerometer or a gyro sensor. In the case where the direction of the body is detected using the accelerometer or the gyro sensor, applying a state of the passenger facing forward as a basic position, a degree of movement of the body is detected based on an acceleration in orthogonal three axes when the passenger performs a behavior of turning a face or a body in a specific direction. Detected accordingly is a degree of an angle of the face or the body with respect to a state where the face or the body faces forward.

According to this method, the direction in which the face or the body faces cannot be accurately specified, thus all of the objects located in directions in which the face or the body is assumed to face are specified as the visually-recognized object.

The method of detecting the object is similar to the detection method in the visually-recognized object specifying unit 103, and also applicable is a method of performing image processing on a video taken by an in-vehicle camera or a method of detecting an object by radar.

The risk-inducing factor candidate setting unit 106 sets the risk-inducing factor candidate group based on a result acquired by the analysis of the passenger information performed in Step S22 (Step S23). For example, when the words of "tomorrow", "the park", and "would like to go" are acquired as a result of the analysis of the voice and "the bicycle" is specified as the object located in the direction in which the passenger points in accordance with the behavior of the passenger, "tomorrow", "the park", "would like to go", and "bicycle" are output as the information of the risk-inducing factor candidate group. The processing of Steps S21 to S23 described above is periodically repeated while the ignition switch of the vehicle is ON.

In this manner, the risk-inducing factor candidate is set by analyzing the voice of the passenger, thus the risk-inducing factor can be specified by the information which cannot be acquired from the driver, for example, in a case where the risk-inducing factor occurs in a blind area for the driver.

The risk-inducing factor candidate is set by analyzing the behavior of the passenger, thus the risk-inducing factor can be specified by analyzing the pointing operation in accordance with the behavior which can be performed only by the passenger, for example, even in a case where the risk-inducing factor gets away from the vehicle.

The risk-inducing factor specifying unit 107 specifies the risk-inducing factor using the information of the visually-recognized object group being output from the visually-recognized object specifying unit 103 and the information of the risk-inducing factor candidate group being output from the risk-inducing factor candidate setting unit 106, and the risk-inducing factor output unit 108 outputs the risk-inducing factor specified in the risk-inducing factor specifying unit 107 outside.

Figure 4:
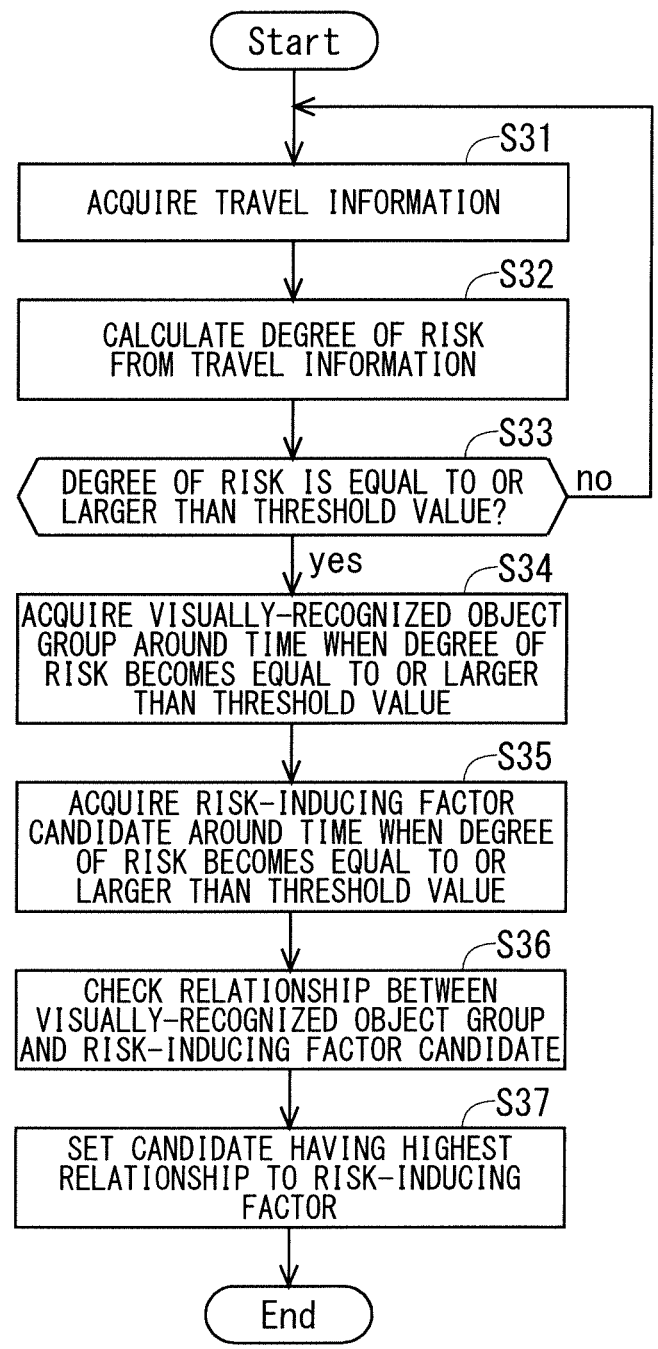
FIG. 4 A flow chart describing operations of a travel information acquisition unit, a degree of risk calculation unit, and a risk-inducing factor specifying unit in the risk information collection device according to the embodiment 1 of the present invention.

Next, processing in the travel information acquisition unit 101, the degree of risk calculation unit 102, and the risk-inducing factor specifying unit 107 is described using a flow chart illustrated in FIG. 4.

The travel information while the vehicle is traveling is acquired in the travel information acquisition unit 101 (Step S31), and is output to the degree of risk calculation unit 102. The travel information includes a speed, an acceleration, brake information, steering angle information, accelerator information, and engine information, for example.

The degree of risk calculation unit 102 calculates a degree of risk which is to be an index whether a travel state of the subject vehicle is in danger based on the travel information being output from the travel information acquisition unit 101 (Step S32), and outputs the degree of risk to the risk-inducing factor specifying unit 107. The degree of risk indicates a degree of risk in the travel state in stages, and when the travel state enters an abnormal state compared with ordinary times, the degree of risk increases.

A case of expressing the degree of risk on a scale of one to ten is described using FIG. 5. In the example illustrated in FIG. 5, the degree of risk is set using speed information, brake information (whether a braking is applied), acceleration information, and steering angle information. At this time, the number of engine rotations, engine information such as a throttle position, and accelerator information may be supplementarily used.

In FIG. 5, a state where a hard braking is applied when a speed is low (lower than a legal speed minus 10 km/h), an acceleration is small, and a change of a steering angle is also small falls under a case of "1" where the degree of risk is the lowest. In the meanwhile, a state where a hard braking is applied when a speed is high (higher than a legal speed plus 10 km/h), an acceleration is large, and a change of a steering angle is also large falls under a case of "10" where the degree of risk is the highest. In a case where the degree of risk is "5" to "8", a speed is equivalent to a legal speed as the speed information, and a state where a speed is equal to or smaller than a legal speed and equal to or larger than a legal speed minus 10 km/h falls under this case. The scale described above is one example, thus a combination of the travel information is not limited thereto.

In this manner, the degree of risk is set by a numeral value in multiple stages, thus it can be determined whether the travel state of the vehicle is in danger based on the numeral value, and an objective determination can be performed.

The risk-inducing factor specifying unit 107 compares the degree of risk calculated in the degree of risk calculation unit 102 and a predetermined threshold value (Step S33). When the degree of risk is smaller than the threshold value (no in Step S33), the risk-inducing factor specifying unit 107 controls the travel information acquisition unit 101 and the degree of risk calculation unit 102 for purpose of repeating the processing subsequent to Step S31. When the degree of risk is equal to or larger than the threshold value (yes in Step S33), the risk-inducing factor specifying unit 107 determines that the travel state of the subject vehicle is in danger, and the processing makes a transition to Step S34.

The threshold value described above is set based on past travel information, however, it may be adjusted for each driver based on past data of each driver. It is also applicable to simulate the occurrence of the dangerous state several times and set the threshold value based on the result thereof. For example, in a case where the degree of risk is set on a scale of one to ten and "1" indicates a safe state and "10" indicates dangerous state, when the dangerous state is made to simulatively occur several times and an average value of the degrees of risk is 4, 4 which is the average value may be used as the threshold value.

Next, the risk-inducing factor specifying unit 107 acquires, from the visually-recognized object specifying unit 103, information of a plurality of visually-recognized objects around a time when the degree of risk becomes equal to or larger than the threshold value, and sets it to the visually-recognized object candidate group (Step S34). Examples of the setting of around the time include approximately ten seconds, fifteen seconds, and thirty seconds. This may be set in consideration of a time until the dangerous state occurs after the driver visually recognizes the risk-inducing factor, that is to say, a time when the degree of risk becomes equal to or larger than the threshold value and a time until the passenger recognize the risk-inducing factor and transmits information thereof after the dangerous state occurs. The reason is that there may be a time lag between a timing at which the driver and the passenger recognize the risk-inducing factor and a timing at which the driver operates the vehicle to apply a brake, for example. Considered, for example, is a case where the words of "the bicycle running out into a road is dangerous" come out after a hard braking. The information of the visually-recognized object group in the timing at which the degree of risk becomes equal to or larger than the threshold value, without considering the time lag, may be acquired from the visually-recognized object specifying unit 103.

Next, the risk-inducing factor specifying unit 107 acquires the plurality of risk-inducing factor candidates around the time when the degree of risk becomes equal to or larger than the threshold value from the risk-inducing factor candidate setting unit 106, and sets the plurality of risk-inducing factor candidates to the risk-inducing factor candidate group (Step S35). Then, the risk-inducing factor specifying unit 107 checks a relationship between the visually-recognized object candidate group and the risk-inducing factor candidate group (Step S36). In checking the relationship, the visually-recognized object candidate group and the risk-inducing factor candidate group before and after the time when the degree of risk becomes equal to or larger than the threshold value are checked without distinction, and the candidates having the highest relationship are set to the risk-inducing factor.

The relationship is quantified as a degree of relationship using information of a size, color, or shape of an object or a meaning of a word. For example, a point of the degree of relationship is set for each of "a word expressing a degree of risk", "a word expressing an object", and "a word expressing a state of an object" with respect to the risk-inducing factor candidate, and the candidate having the highest point of the degree of relationship is set to the risk-inducing factor (Step S37).

For example, words expressing a danger such as "dangerous", "risk" and words associated with a dangerous behavior such as "could not see", "ran out into the road", "ran across the car" are defined as "the word expressing the degree of risk". A noun such a "cat" and "bicycle" is defined as "the word expressing the object". A word expressing a shape, size, and color of the object such as "small" and "white" is defined as "the word expressing the state of the object".

Then, the point is assigned to the visually-recognized object candidate so that the point of "the word expressing the degree of risk" is set to ten, the point of "the word expressing the object" is set to five, and "the word expressing the state of the object" is set to one. The point is assigned for each risk-inducing factor candidate regulated in a set of one sentence. Specific processing in Steps S36 and S37 is described using a flow chart illustrated in FIG. 6.

As illustrated in FIG. 6, in checking the relationship between the visually-recognized object candidate group and the risk-inducing factor candidate group, it is firstly confirmed whether or not there is "the word expressing the object" in the risk-inducing factor candidate regulated in the set of one sentence (Step S101). Then, there is "the word expressing the object" (yes in Step S101), it is confirmed whether or not "the word expressing the object" or an equivalent term thereof coincides with the visually-recognized object candidate (Step S102). When there is no "word expressing the object" (no in Step S101), the processing makes a transition to Step S112.

When "the word expressing the object" or the equivalent term thereof coincides with the visually-recognized object candidate (yes) in Step S102, it is associated with (linked with) the coincided visually-recognized object candidate (Step S103), and the processing makes a transition to Step S104. In the meanwhile, when "the word expressing the object" or the equivalent term thereof does not coincide with the visually-recognized object candidate (no), the point is not assigned to the one sentence of the risk-inducing factor candidate (Step S115), and the processing makes a transition to Step S107.

In Step S112, the visually-recognized object candidate is selected from the visually-recognized object candidate group based on the shape, size, and color, and it is confirmed whether or not a property of the visually-recognized object candidate coincides with that of "the word expressing the state of the object". Then, when the property thereof coincides with that of "the word expressing the state of the object" (yes in Step S112), it is associated with the coincided visually-recognized object candidate (Step S113), and the processing makes a transition to Step S104. In the meanwhile, when the property thereof does not coincide with that of "the word expressing the state of the object" (no), the point is not assigned to the one sentence of the risk-inducing factor candidate (Step S114), and the processing makes a transition to Step S107.

In Step S104, it is confirmed whether or not there is "the word expressing the degree of risk" in the risk-inducing factor candidate. When there is "the word expressing the degree of risk" (yes in Step S104), the processing makes a transition to Step S108 to add ten points to the degree of relationship of the associated visually-recognized object candidate, and the processing makes a transition to Step S105. In the meanwhile, when there is no "word expressing the degree of risk" (no in Step S104), the processing makes a transition to Step S105.

In Step S105, it is confirmed whether or not there is "the word expressing the object" in the risk-inducing factor candidate. When there is "the word expressing the object" (yes in Step S105), the processing makes a transition to Step S109 to add five points to the degree of relationship of the associated visually-recognized object candidate, and the processing makes a transition to Step S106. In the meanwhile, when there is no "word expressing the object" (no in Step S105), the processing makes a transition to Step S106.

In Step S106, it is confirmed whether or not there is "the word expressing the state of the object" in the risk-inducing factor candidate. When there is "the word expressing the state of the object" (yes in Step S106), the processing makes a transition to Step S110 to add one point to the degree of relationship of the associated visually-recognized object candidate, and the processing makes a transition to Step S107. In the meanwhile, when there is no "word expressing the state of the object" (no), the processing makes a transition to Step S107.

In Step S107, it is confirmed whether or not there is an unprocessed risk-inducing factor candidate on which checking processing has not been performed. When there is the unprocessed risk-inducing factor candidate (yes in Step S107), the processing subsequent to Step S101 is repeated, and there is no unprocessed risk-inducing factor candidate (no in Step S107), the processing makes a transition to Step S111.

The above description is based on an assumption that there are the plurality of risk-inducing factor candidates. However, when there is only one risk-inducing factor candidate and the risk-inducing factor candidate is associated with the visually-recognized object candidate in Step S103 or Step S113, it is confirmed that the risk-inducing factor candidate and the visually-recognized object candidate are associated with each other only by that processing, and the risk-inducing factor can be specified.

Steps S104 to S111 can be considered as the necessary steps when there are the plurality of risk-inducing factor candidates, and can correspond to a case where there are the plurality of risk-inducing factor candidates.

Figure 7:
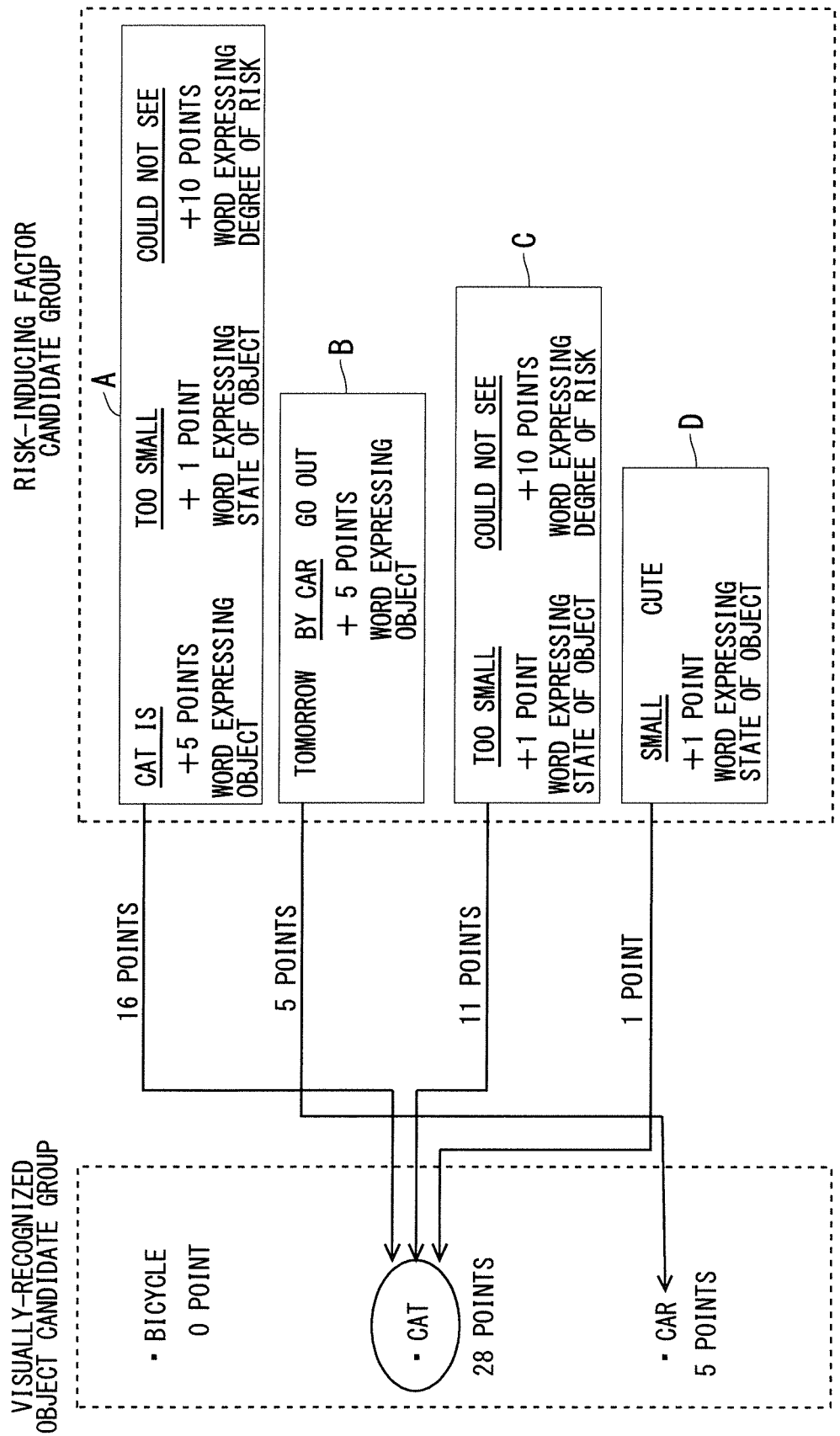
FIG. 7 A drawing describing an example of the relationship between the visually-recognized object candidate group and the risk-inducing factor candidate group.

FIG. 7 is a drawing illustrating an example of calculating the degree of relationship according to the checking processing described above. As illustrated in FIG. 7, described is a method of calculating the degree of relationship in a case where there is "cat" in the visually-recognized object candidate group and there is a risk-inducing factor candidate A of "cat is", "too small", and "could not see". To the visually-recognized object candidate of "cat", five points are added by "cat is" which is "the word expressing the object", one point is added by "too small" which is "the word expressing the state of the object", and ten points are added by "could not see" which is "the word expressing the degree of risk". That is to say, the degree of relationship between the risk-inducing factor candidate A and "cat" included in the visually-recognized object candidate is sixteen points.

A risk-inducing factor candidate C of "too small" and "could not see" has eleven points made up of one point added to "too small" and ten points added to "could not see". In this case, "small" used as a word for replacing "cat" is included, thus the risk-inducing factor candidate C is associated with "cat" included in the visually-recognized object candidate.

A risk-inducing factor candidate D of "small" and "cute" has one point made up of one point added to "small". In this case, "small" used as a word for replacing "cat" is included, thus the risk-inducing factor candidate D is associated with "cat" included in the visually-recognized object candidate.

Accordingly, the degree of relationship between the risk-inducing factor candidates A, C, and D and "cat" included in the visually-recognized object candidate is twenty-eight points in total.

A risk-inducing factor candidate B of "tomorrow", "by car", and "go out" has five points made up of five points added to "by car" which is "the word expressing the object". The visually-recognized object candidate group includes "car", thus the degree of relationship between the risk-inducing factor candidate B and "car" included in the visually-recognized object candidate is five points.

"Bicycle" included in the visually-recognized object candidate does not have a word relating to the risk-inducing factor candidate group, thus the degree of relationship is zero point.

In Step S111, the risk-inducing factor candidate having the highest point of degree of relationship with the visually-recognized candidate is specified as the risk-inducing factor. For example, the risk-inducing factor candidate A has the highest point of degree of relationship with "cat" included in the visually-recognized candidate in the risk-inducing factor candidates A, C, and D associated with "cat" included in the visually-recognized candidate. "Cat" which is "the word expressing the object" is specified as the risk-inducing factor, and the risk-inducing factor being output by the risk-inducing factor output unit 108 is eventually determined to be "cat".

The degree of relationship between the visually-recognized object candidate group and the risk-inducing factor candidate group may be sequentially calculated as described above, however, also applicable is a method of setting a combination of the visually-recognized object and the risk-inducing factor having the high degree of relationship in advance and selecting a combination coinciding with the preset combination. For example, as the method of setting the combination, when the visually-recognized object is "cat", "cat" is combined with a word expressing a size, color, or shape such as "small", "downy", "hair", "ears", "white", "black", and "tail" each used as a word for replacing "cat". When the visually-recognized object is "car", "car" is combined with a word expressing the size, color, and shape such as "black", "large", "wagon", "hood", "small", "opened", and "broom-broom". For example, when "cat" is included in the visually-recognized object candidate group and there is the word of "hair" in the risk-inducing factor candidate, "hair", that is to say, "cat" having the high relationship is specified as the risk-inducing factor.

Herein, a destination of information being output from the risk-inducing factor output unit 108 is mainly a driver and a passenger of a non-subject vehicle, and a smartphone and a car navigation system mounted on the non-subject vehicle to which the information is transmitted via a cloud server, for example. It is also applicable that the destination of the information is a system included in the subject vehicle and an output result is stored in a predetermined storage device.

When the information is provided to the driver of the non-subject vehicle, for example, as the destination of the information, a display of alerting the driver's attention such as "bicycle often runs out into the road" and "beware the dog" is displayed on a screen of a car navigation system, for example.

When the destination of the information is the subject vehicle, "today's near miss information (a near miss caused by a cat)" is displayed on a screen of a car navigation system or a smartphone of the driver at the end of driving the vehicle. The above configuration enables the driver to look back his/her driving, and can be used for improving a driving technique.

The information is output to the cloud server, for example, to combine the information with information of the plurality of other vehicles, thus "near miss" information can be analyzed in detail, the number of "near miss" can be reduced by removing factors and performing a drive guidance on the driver, and a traffic accident can be prevented.

As described above, according to the risk information collection device 100 of the embodiment 1 of the present invention, the object inducing the risk can be specifically specified. Thus, the factor which has induced the risk can be specified in addition to the function of specifying the dangerous spot, thus the user can be provided with the information indicating the cause of the risk.

Embodiment 2

Figure 8:
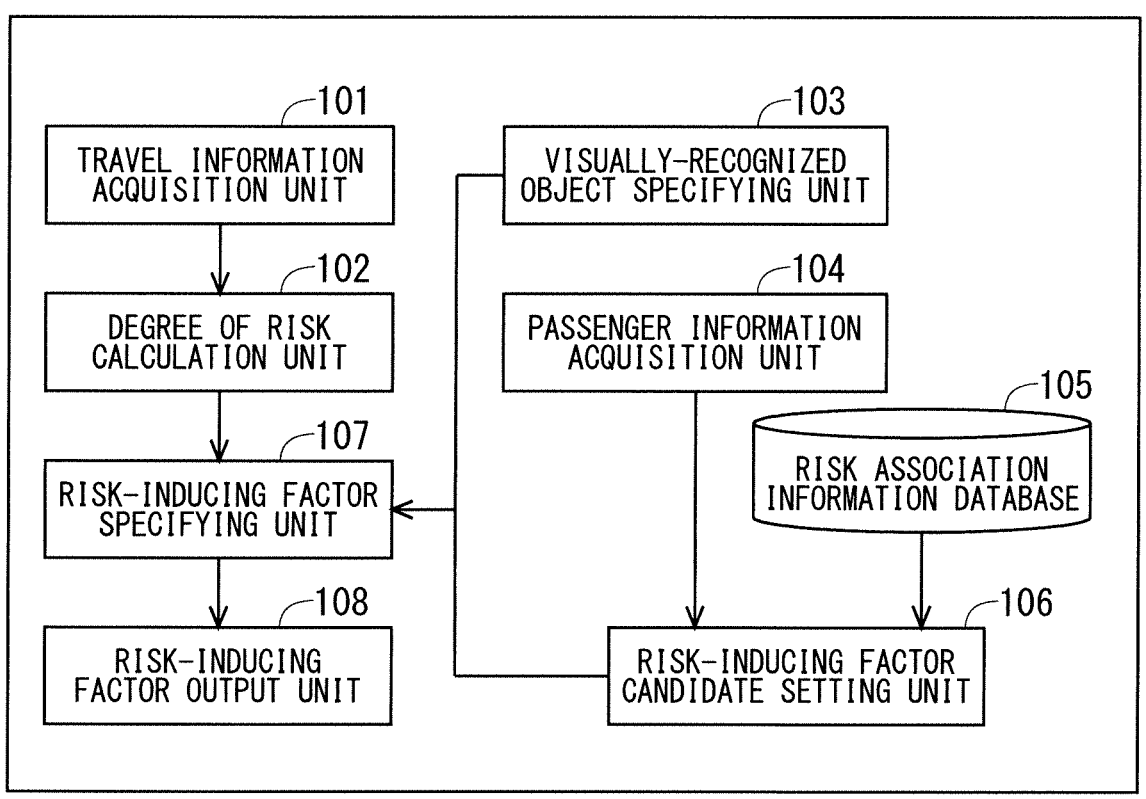
FIG. 8 A function block diagram illustrating a configuration of a risk information collection device according to an embodiment 2 of the present invention.

FIG. 8 is a function block diagram illustrating a configuration of a risk information collection device 200 according to an embodiment 2 of the present invention. The risk information collection device 200 illustrated in FIG. 8 includes a risk association information database 105 in addition to the configuration of the risk information collection device 100 according to the embodiment 1 illustrated in FIG. 1. In FIG. 8, the same reference numerals will be assigned to the same configuration as the risk information collection device 100 described using FIG. 1, and a duplicate description is omitted.

The risk association information database 105 stores information associated with a risk for each passenger information. That is to say, when the passenger information is the word pronounced by the passenger, the word associated with the risk is stored. Examples of the word associated with the risk include "could not see", "dangerous", and "barely okay". When the passenger information is the information of the object indicated by the passenger, examples of the object associated with the risk include "bicycle", "pedestrian", "car", "telephone pole", and "dog".

In the risk-inducing factor candidate setting unit 106, processing of analyzing the passenger information and setting the risk-inducing factor candidate group is the same as that in the embodiment 1, however, added is processing of checking an analysis result of the passenger information and information associated with the risk stored in the risk association information database 105.

Figure 9:
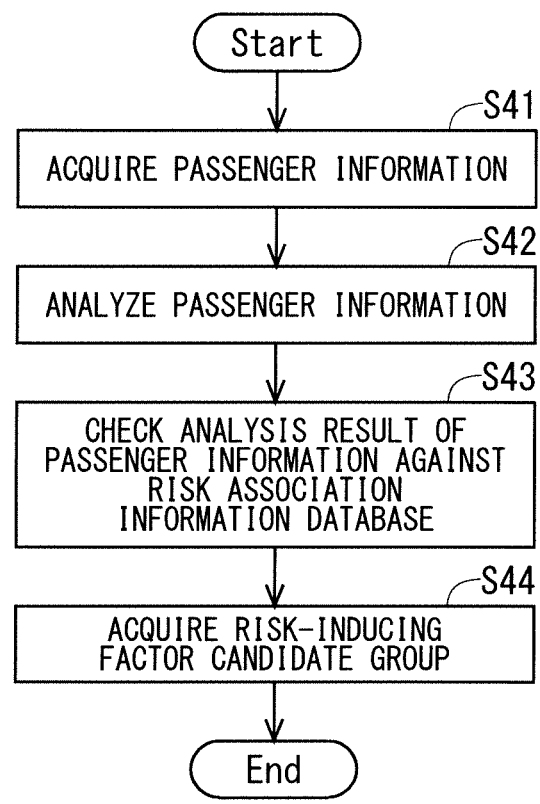
FIG. 9 A flow chart describing operations of a passenger information acquisition unit and a risk-inducing factor candidate setting unit in the risk information collection device according to the embodiment 2 of the present invention.

Processing in the passenger information acquisition unit 104 and the risk-inducing factor candidate setting unit 106 is described herein using a flow chart illustrated in FIG. 9.

The passenger information is acquired in the passenger information acquisition unit 104 (Step S41). The passenger information is provided to the risk-inducing factor candidate setting unit 106, and is analyzed in the risk-inducing factor candidate setting unit 106 (Step S42).

Processing of dividing the voice into single words is performed using voice recognition as the analysis of the voice pronounced by the passenger. The object located in a direction indicated by the passenger is specified using information of a behavior of the passenger or a direction of the passenger's face or body as the analysis of the object indicated by the passenger.

Then, checked is the analysis result of the passenger information acquired in Step S42 against the information associated with the risk stored in the risk association information database 105 (Step S43). In Step S43, when it is analyzed in Step S42 that information of "bicycle", "could not see", and "tomorrow" is included in the words pronounced by the passenger, for example, and words of "could not see" are stored in the risk association information database 105, it is determined that the degree of relationship of the words of "could not see" is high. Then, the words of "could not see" and the words of "bicycle" and "tomorrow" pronounced before and after the words of "could not see" are set to the risk-inducing factor candidate (Step S44).

The risk association information database 105 includes the words of "could not see" which often occurs in a conversation between passengers in the vehicle at the time of the dangerous state, for example, thus useless information is prevented from being included as the risk-inducing factor candidate, and the information can be refined. For example, in a case where the analysis result in Step S42 includes information of "a bicycle ran out into the road", "I want to have a cat", "I am hungry", for example, when the analysis result is not checked against the risk association information database 105, the words of "bicycle", "ran out into the road", "cat", "want to have", and "hungry" are set to the risk-inducing factor candidate. However, the risk association information database 105 includes the words of "ran out into the road", it is possible to determine that the degree of relationship of the words of "ran out into the road" is high, and set only the words of "bicycle", "ran out into the road", and "cat" to the risk-inducing factor candidate group. The risk association information database 105 stores an expected word in a predetermined storage device in advance as a database. It is also applicable to add information of the risk-inducing factor candidate acquired in the risk-inducing factor candidate setting unit 106 in accordance with the operation of the risk information collection device 200 to the database, thereby enhancing the database.

The risk-inducing factor specifying unit 107 specifies the risk-inducing factor using the information of the visually-recognized object group being output from the visually-recognized object specifying unit 103 and the information of the risk-inducing factor candidate group being output from the risk-inducing factor candidate setting unit 106. The risk-inducing factor output unit 108 outputs the risk-inducing factor specified in the risk-inducing factor specifying unit 107 outside.

Figure 10:
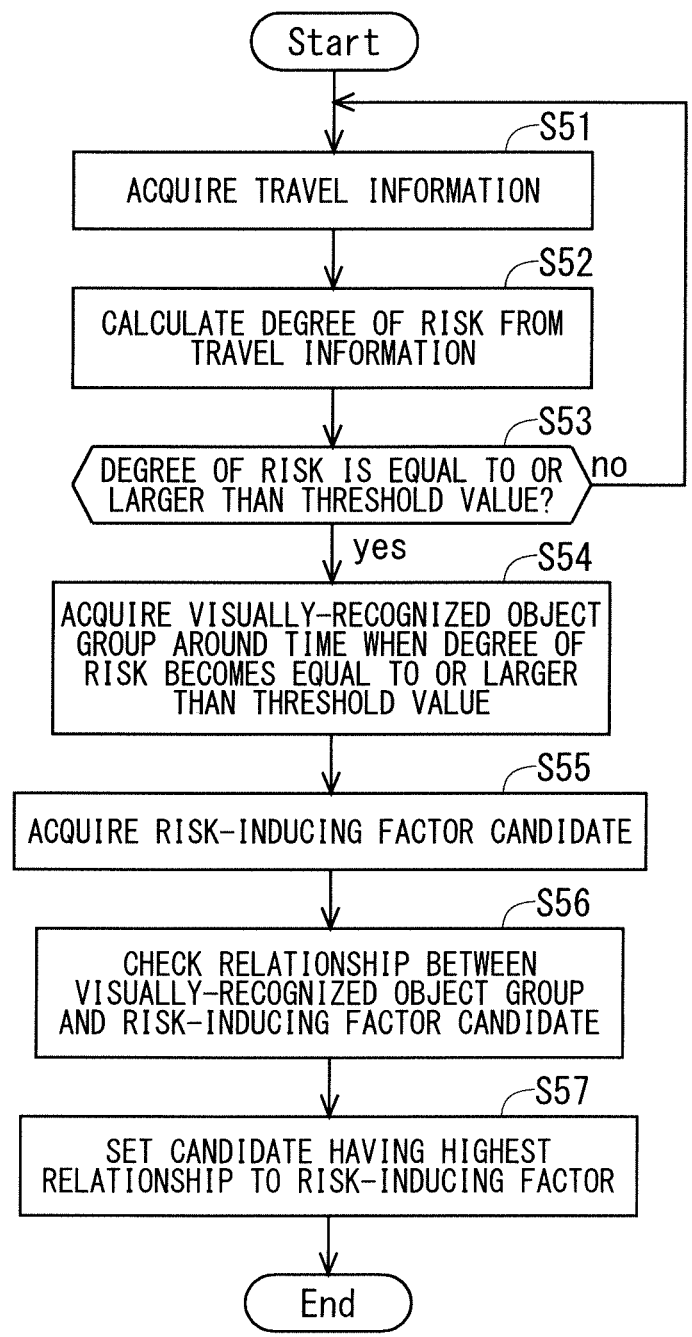
FIG. 10 A flow chart describing operations of a travel information acquisition unit, a degree of risk calculation unit, and a risk-inducing factor specifying unit in the risk information collection device according to the embodiment 2 of the present invention.

Next, processing in the travel information acquisition unit 101, the degree of risk calculation unit 102, and the risk-inducing factor specifying unit 107 is described using a flow chart illustrated in FIG. 10.

The travel information while the vehicle is traveling is acquired in the travel information acquisition unit 101 (Step S51), and is output to the degree of risk calculation unit 102.

The degree of risk calculation unit 102 calculates a degree of risk which is to be an index whether a travel state of the subject vehicle is in danger based on the travel information being output from the travel information acquisition unit 101 (Step S52), and outputs the degree of risk to the risk-inducing factor specifying unit 107.

The risk-inducing factor specifying unit 107 compares the degree of risk calculated in the degree of risk calculation unit 102 and a predetermined threshold value (Step S53). When the degree of risk is smaller than the threshold value (no in Step S53), the risk-inducing factor specifying unit 107 controls the travel information acquisition unit 101 and the degree of risk calculation unit 102 for purpose of repeating the processing subsequent to Step S51. When the degree of risk is equal to or larger than the threshold value (yes in Step S53), the risk-inducing factor specifying unit 107 determines that the travel state of the subject vehicle is in danger, and the processing makes a transition to Step S54. The method of setting the threshold value is the same as that in the embodiment 1.

Next, the risk-inducing factor specifying unit 107 acquires, from the visually-recognized object specifying unit 103, information of a visually-recognized object group around a time when the degree of risk becomes equal to or larger than the threshold value (Step S54).

Next, the risk-inducing factor specifying unit 107 acquires all the risk-inducing factor candidates acquired from the risk-inducing factor candidate setting unit 106 before this processing is started after the vehicle is activated (Step S55). In this manner, all the risk-inducing factor candidates are acquired without a refinement in accordance with time, thus the visually-recognized object candidate and the risk-inducing factor candidate can be linked with each other even in a state where a point of time when the dangerous state occurs and a point of time when the information regarding the risk-inducing factor is acquired from the passenger are away from each other, that is to say, even when there is a time gap therebetween. For example, the visually-recognized object candidate and the risk-inducing factor candidate can be linked with each other even in a case where the passenger says that "the cat running out into the road was dangerous at that time", for example, regarding the dangerous state when the traveling is finished sometime after the dangerous state has occurred.

Next, the risk-inducing factor specifying unit 107 checks a relationship between the visually-recognized object candidate group and the risk-inducing factor candidate group (Step S56). In checking the relationship, the candidate having the highest relationship is set to the risk-inducing factor.

The relationship is quantified as a degree of relationship using information of a size, color, or shape of an object or a meaning of a word. For example, a point of the degree of relationship is set for each of "a word expressing a degree of risk", "a word expressing an object", and "a word expressing a state of an object" with respect to the risk-inducing factor candidate, and the candidate having the highest point of the degree of relationship is set to the risk-inducing factor (Step S57).

For example, words expressing a danger such as "dangerous", "risk" and words associated with a dangerous behavior such as "could not see", "ran out into the road", "ran across the car" are defined as "the word expressing the degree of risk". A noun such a "cat" and "bicycle" is defined as "the word expressing the object". A word expressing a shape, size, and color of the object such as "small" and "white" is defined as "the word expressing the state of the object".

Then, the point is assigned to the visually-recognized object candidate so that the point of "the word expressing the degree of risk" is set to ten, the point of "the word expressing the object" is set to five, and "the word expressing the state of the object" is set to one. The point is assigned for each set of one sentence of the risk-inducing factor candidate. Specific processing in Steps S56 and S57 is the same as that described using FIG. 6.

The risk-inducing factor output unit 108 outputs the risk-inducing factor specified in Step S57 outside. A destination of information being output from the risk-inducing factor output unit 108 is mainly a driver and a passenger of a non-subject vehicle, and a smartphone and a car navigation system mounted on the non-subject vehicle to which the information is transmitted via a cloud server, for example. It is also applicable that the destination of the information is a system included in the subject vehicle and an output result is stored in a predetermined storage device.

As described above, according to the risk information collection device 200 of the embodiment 2 of the present invention, the object inducing the risk can be specifically specified. Thus, the factor which has induced the risk can be specified in addition to the function of specifying the dangerous spot, thus the user can be provided with the information indicating the cause of the risk. The risk information collection device 200 includes the risk association information database 105. The analysis result of the passenger information is checked against the information associated with the risk stored in the risk association information database 105, thus useless information is prevented from being included as the risk-inducing factor candidate, and the information can be refined. Accordingly, an amount of time spent on the acquisition of the risk-inducing factor candidate can be reduced.

Embodiment 3

Figure 11:
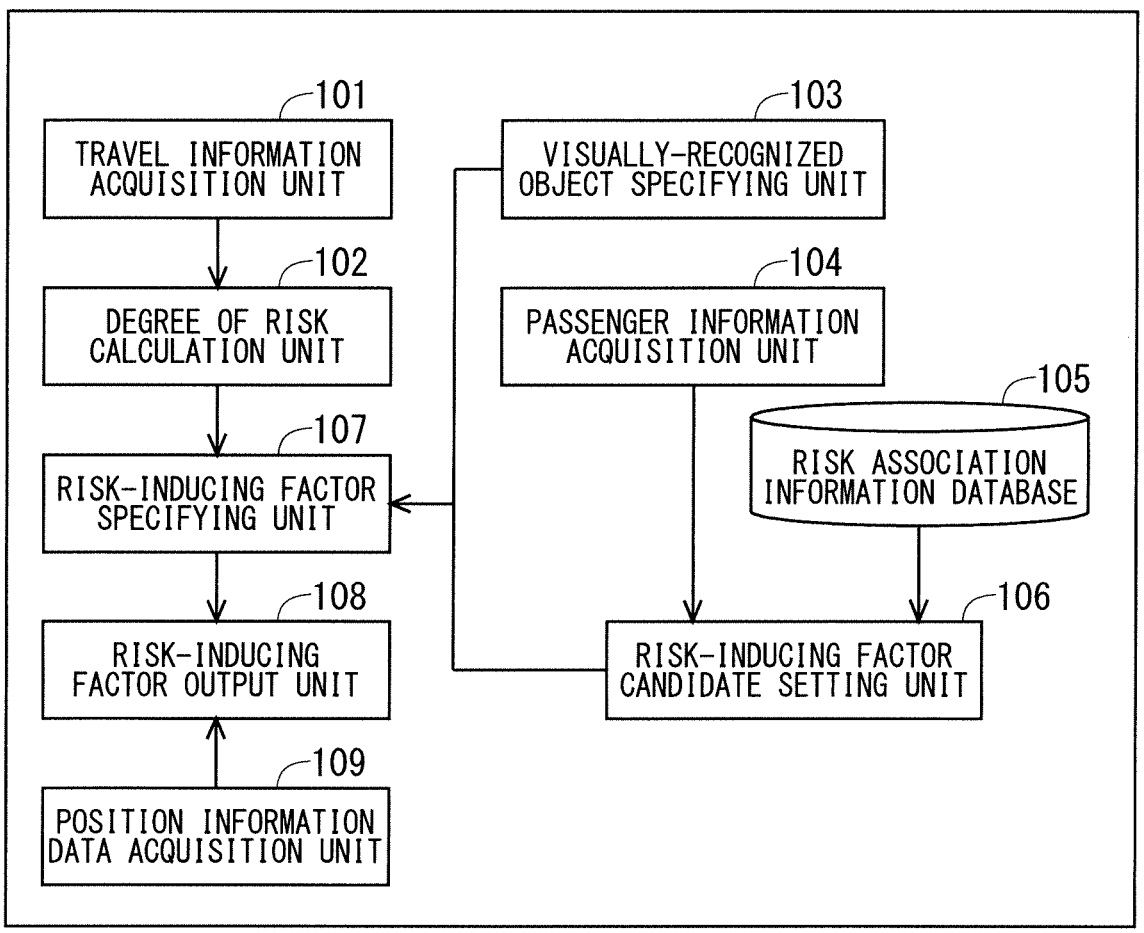
FIG. 11 A function block diagram illustrating a configuration of a risk information collection device according to an embodiment 3 of the present invention.

FIG. 11 is a function block diagram illustrating a configuration of a risk information collection device 300 according to an embodiment 3 of the present invention. The risk information collection device 300 illustrated in FIG. 11 includes a position information data acquisition unit 109 acquiring a position of the subject vehicle in addition to the configuration of the risk information collection device 200 according to the embodiment 2 illustrated in FIG. 8. In FIG. 11, the same reference numerals will be assigned to the same configuration as the risk information collection device 200 described using FIG. 8, and a duplicate description is omitted. Also applicable is a configuration including the position information data acquisition unit 109 acquiring the position of the subject vehicle in addition to the configuration of the risk information collection device 100 according to the embodiment 1.

In the position information data acquisition unit 109, a positioning system such as global positioning system (GPS) is used for acquiring the position of the subject vehicle.

As illustrated in FIG. 11, position information of the subject vehicle acquired in the position information data acquisition unit 109 is output to the risk-inducing factor output unit 108. The risk-inducing factor output unit 108 outputs the risk-inducing factor specified in the risk-inducing factor specifying unit 107 and the position information of the subject vehicle at a point of time when the dangerous state has occurred. The point of time when the dangerous state has occurs is a time when the degree of risk calculated in the degree of risk calculation unit 102 becomes equal to or larger than the threshold value.

A destination of information being output from the risk-inducing factor output unit 108 is mainly a driver and a passenger of a non-subject vehicle, and a smartphone and a car navigation system mounted on the non-subject vehicle to which the information is transmitted via a cloud server, for example. It is also applicable that the destination of the information is a system included in the subject vehicle and an output result is stored in a predetermined storage device.

As described above, according to the risk information collection device 300 of the embodiment 3 of the present invention, the object inducing the risk can be specifically specified. Thus, the factor which has induced the risk can be specified in addition to the function of specifying the dangerous spot, thus the user can be provided with the information indicating the cause of the risk. The risk information collection device 300 includes the risk association information database 105, and checks the analysis result of the passenger information against the information associated with the risk stored in the risk association information database 105. Accordingly, useless information is prevented from being included as the risk-inducing factor candidate, and the information can be refined. Thus, an amount of time spent on the acquisition of the risk-inducing factor candidate can be reduced. The risk information collection device 300 outputs the position information of the subject vehicle at the point of time when the dangerous state has occurred, thus the more specific information regarding the dangerous state can be provided. For example, measures can be easily taken so that that the non-subject vehicle getting close to a position where the dangerous state, which the subject vehicle encountered, has occurred avoids the risk, for example.

Embodiment 4

FIG. 12 is a function block diagram illustrating a configuration of a risk information collection device 400 according to an embodiment 4 of the present invention. The risk information collection device 400 illustrated in FIG. 12 includes a surround information collection unit 110 collecting surround information of a position where the dangerous state has occurred in addition to the configuration of the risk information collection device 300 according to the embodiment 3 illustrated in FIG. 11. In FIG. 12, the same reference numerals will be assigned to the same configuration as the risk information collection device 300 described using FIG. 11, and a duplicate description is omitted. Also applicable is a configuration including the position information data acquisition unit 109 acquiring the position of the subject vehicle in addition to the configuration of the risk information collection device 100 according to the embodiment 1 or the configuration of the risk information collection device 200 according to the embodiment 2.

As illustrated in FIG. 12, the surround information, collected in the surround information collection unit 110, in a position where the dangerous state has occurred is output to the risk-inducing factor output unit 108. The risk-inducing factor output unit 108 outputs the risk-inducing factor specified in the risk-inducing factor specifying unit 107, the position information of the subject vehicle at the point of time when the dangerous state has occurred, and the surround information, collected in the surround information collection unit 110, in a position where the dangerous state has occurred.

The surround information is information such as a time, weather, a congestion degree of vehicle, and a congestion degree of people acquired from surrounding area of the subject vehicle. With regard to the congestion degree of vehicle, a range of the surrounding area is specified within a radius centering on the subject vehicle, for example, and the radius may be selected from 1 km, 3 km, and 5 km. With regard to the congestion degree of people, a range of the surrounding area is specified within a radius centering on the subject vehicle, for example, and the radius may be selected from 100 m, 300 m, and 500 m.

The congestion degree of people in the surround information can be collected from a cloud service using Internet. For example, information of a position where the subject vehicle is located can be collected from a homepage publishing information of the congestion degree which an Internet service company providing a free application acquires from a usage situation of the free application. The congestion degree of vehicle can also be collected from a homepage of a traffic jam information service on Internet. The time and the weather, for example, can be collected from a homepage on Internet.

The congestion degree of people may be obtained by recognizing a human by image recognition and dividing the number of people in a predetermined range by an area of the predetermined range, using a video taken by a camera mounted on the subject vehicle to take a video outside the vehicle or a camera, such as a street camera near the subject vehicle, disposed outside the vehicle. When the video taken by the camera disposed outside the vehicle is used, the video is transmitted from the camera disposed outside the vehicle to the risk information collection device 400 via a direct communication between the camera disposed outside the vehicle and the risk information collection device 400 or a cloud server, thus the video taken by the camera disposed outside the vehicle can be used.

A destination of information being output from the risk-inducing factor output unit 108 is mainly a driver and a passenger of a non-subject vehicle, and a smartphone and a car navigation system mounted on the non-subject vehicle to which the information is transmitted via a cloud server, for example. It is also applicable that the destination of the information is a system included in the subject vehicle and an output result is stored in a predetermined storage device.

As described above, according to the risk information collection device 400 of the embodiment 4 of the present invention, the object inducing the risk can be specifically specified. Thus, the factor which has induced the risk can be specified in addition to the function of specifying the dangerous spot, thus the user can be provided with the information indicating the cause of the risk. The risk information collection device 400 includes the risk association information database 105, and checks the analysis result of the passenger information against the information associated with the risk stored in the risk association information database 105. Accordingly, useless information is prevented from being included as the risk-inducing factor candidate, and the information can be refined, thus an amount of time spent on the acquisition of the risk-inducing factor candidate can be reduced. The risk information collection device 400 outputs the position information of the subject vehicle at the point of time when the dangerous state has occurred and the surround information of the position where the dangerous state has occurred, thus the more specific information regarding the dangerous state can be provided. Accordingly, measures can be easily taken so that that the non-subject vehicle getting close to a position where the dangerous state, which the subject vehicle encountered, has occurred avoids the risk, for example, and measures of avoiding a traffic jam can be easily taken based on the surround information, for example.

Embodiment 5

Figure 13:
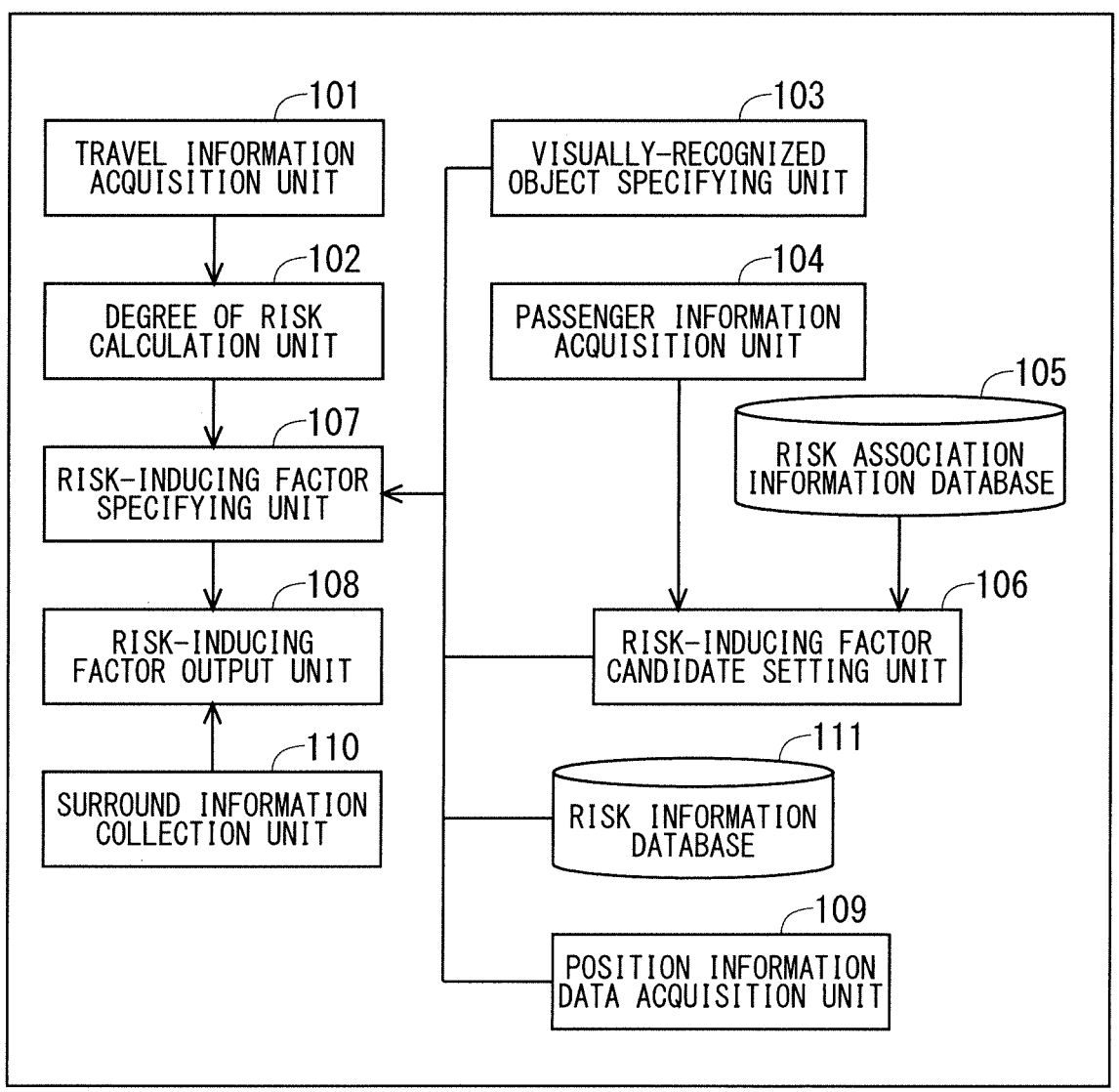
FIG. 13 A function block diagram illustrating a configuration of a risk information collection device according to an embodiment 5 of the present invention.
Figure 15:
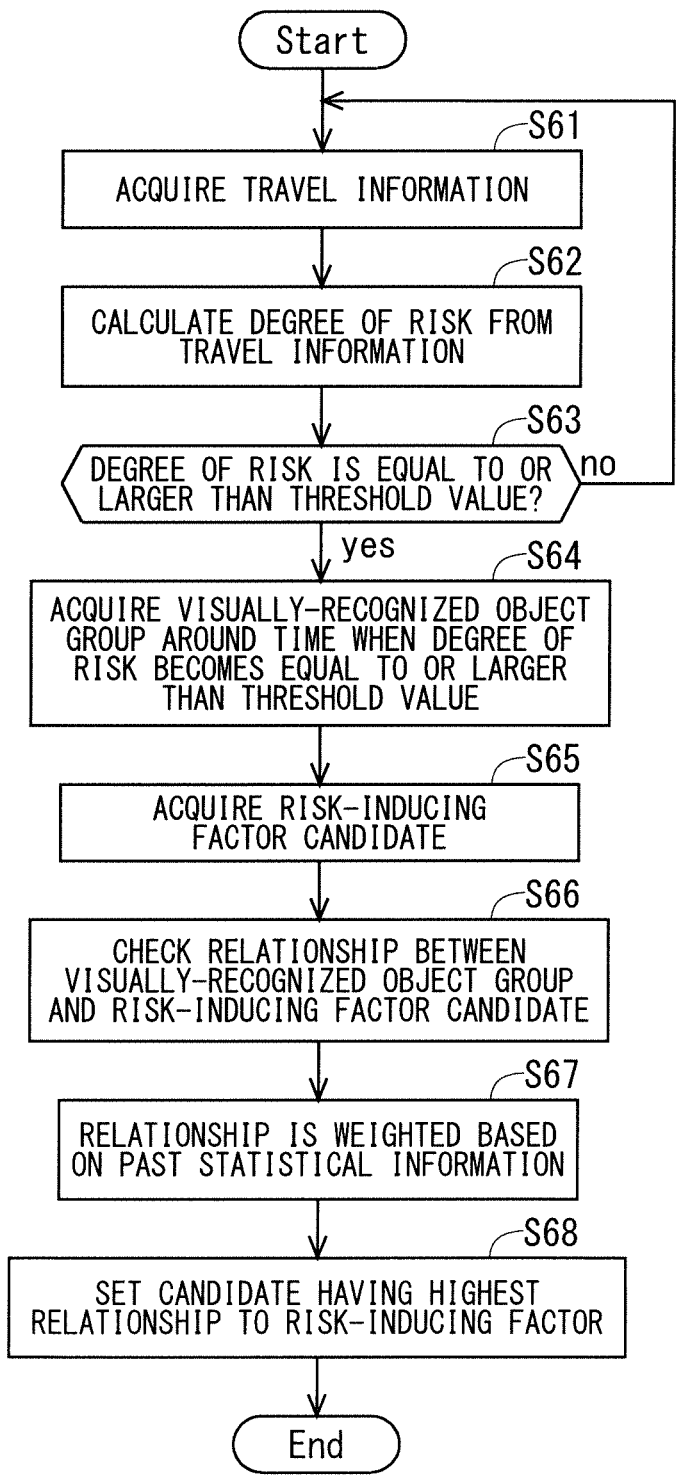
FIG. 15 A flow chart describing operations of a travel information acquisition unit, a degree of risk calculation unit, and a risk-inducing factor specifying unit in the risk information collection device according to the embodiment 5 of the present invention.

FIG. 13 is a function block diagram illustrating a configuration of a risk information collection device 500 according to an embodiment 5 of the present invention. The risk information collection device 500 illustrated in FIG. 13 includes a risk information database 111 in which a risk-inducing factor which occurred in past and position information are registered in addition to the configuration of the risk information collection device 400 according to the embodiment 4 illustrated in FIG. 12. In FIG. 15, the same reference numerals will be assigned to the same configuration as the risk information collection device 400 described using FIG. 12, and a duplicate description is omitted.

As illustrated in FIG. 13, past risk information accumulated in the risk information database 111 is output to the risk-inducing factor specifying unit 107. The risk-inducing factor specifying unit 107 specifies the risk-inducing factor using the information of the visually-recognized object group being output from the visually-recognized object specifying unit 103, the information of the risk-inducing factor candidate group being output from the risk-inducing factor candidate setting unit 106, the current position information being output from the position information data acquisition unit 109, and the past risk information being output from the risk information database 111, and outputs the risk-inducing factor to the risk-inducing factor output unit 108.

The risk information database 111 records a past risk-inducing factor and position information in a position thereof and time information. The risk information database 111 may store a vehicle ID. The vehicle ID is identification information for identifying a vehicle, and a manufacturing number may be applied to the vehicle ID, for example. FIG. 14 illustrates an example of the past risk information recorded in the risk information database 111.

The risk-inducing factor and the position information are input from the risk-inducing factor output unit 108 to the risk information database 111, and stored in the risk information database 111. Risk information accumulated in past may be stored in the risk information database 111 at a time of shipping the risk information collection device 500.

In FIG. 14, the cat and the bicycle are recorded as the risk-inducing factor, and the vehicle ID of the vehicle which has encountered the cat and the bicycle and latitude and longitude information as the position information in a position where the vehicle has encountered the cat and the bicycle are recorded with time information of a time of the encounter.

FIG. 15 is a flow chart describing an operation of the risk information collection device 500. Processing in Steps S61 to S65 is the same as the processing in Steps S51 to S55 in the flow chart illustrated in FIG. 10, and processing of calculating the degree of relationship between the visually-recognized object candidate group and the risk-inducing factor candidate in the risk-inducing factor specifying unit 107 is the same as that in the embodiment 4. However, added is weighting processing in Step S67 for adding a numeral value to the degree of relationship based on the risk-inducing factor and the position information which are past statistical information stored in the risk information database 111 after the degree of relationship is calculated as the numeral value in Step S66.

As illustrated in FIG. 14, the risk information database 111 records the past risk-inducing factor and the position information in the position thereof. The risk-inducing factor specifying unit 107 checks the relationship between the visually-recognized object candidate group and the risk-inducing factor candidate group from the information of the visually-recognized object group being output from the visually-recognized object specifying unit 103 and the information of the risk-inducing factor candidate group being output from the risk-inducing factor candidate setting unit 106 (Step S66).

After checking the relationship, the risk-inducing factor specifying unit 107 searches the information stored in the risk information database 111 to confirm, based on the position information being output from the position information data acquisition unit 109, whether or not there are position information at a point of time when the degree of risk calculated in the degree of risk calculation unit 102 becomes equal to or larger than a threshold value and a risk-inducing factor associated with a surrounding area of a position indicated by the position information. The range of the surrounding area is specified within a radius centering on the subject vehicle, for example, and the radius may be selected from 300 m, 500 m, and 1 km.

When there is the corresponding risk-inducing factor, the risk-inducing factor specifying unit 107 acquires information thereof. The risk-inducing factor specifying unit 107 checks the risk-inducing factor candidate against the past risk-inducing factor which has been acquired, and when the risk-inducing factor candidate coincides with the past risk-inducing factor, a point is added to the degree of relationship of the coinciding risk-inducing factor candidate (Step S67).

For example, in a case where there is the word of "cat" in the past risk-inducing factor which has been acquired, the point is added to the degree of relationship of "cat" in the risk-inducing factor candidate when there is "cat" in the risk-inducing factor candidate.

The risk-inducing factor specifying unit 107 determines the risk-inducing factor candidate having the highest point of the degree of relationship, including the weighted degree of relationship, to be the risk-inducing factor (Step S68).

As described above, according to the risk information collection device 500 of the embodiment 5 of the present invention, the object inducing the risk can be specifically specified. Thus, the factor which has induced the risk can be specified in addition to the function of specifying the dangerous spot, thus the user can be provided with the information indicating the cause of the risk. The risk information collection device 500 includes the risk information database 111, and uses the past risk-inducing factor based on the position information. Accordingly, the information of the risk-inducing factor, such as geographical characteristics, which tends to occur in a specific position can be added to the checking of the relationship, thus accuracy for specifying the risk-inducing factor can be increased.

Modification Example

The position information data acquisition unit 109 and the risk information database 111 are added to the risk information collection device 100 in the embodiment 1 or the risk information collection device 200 in the embodiment 2, thereby being able to increase the accuracy for specifying the risk-inducing factor.

Figure 16:
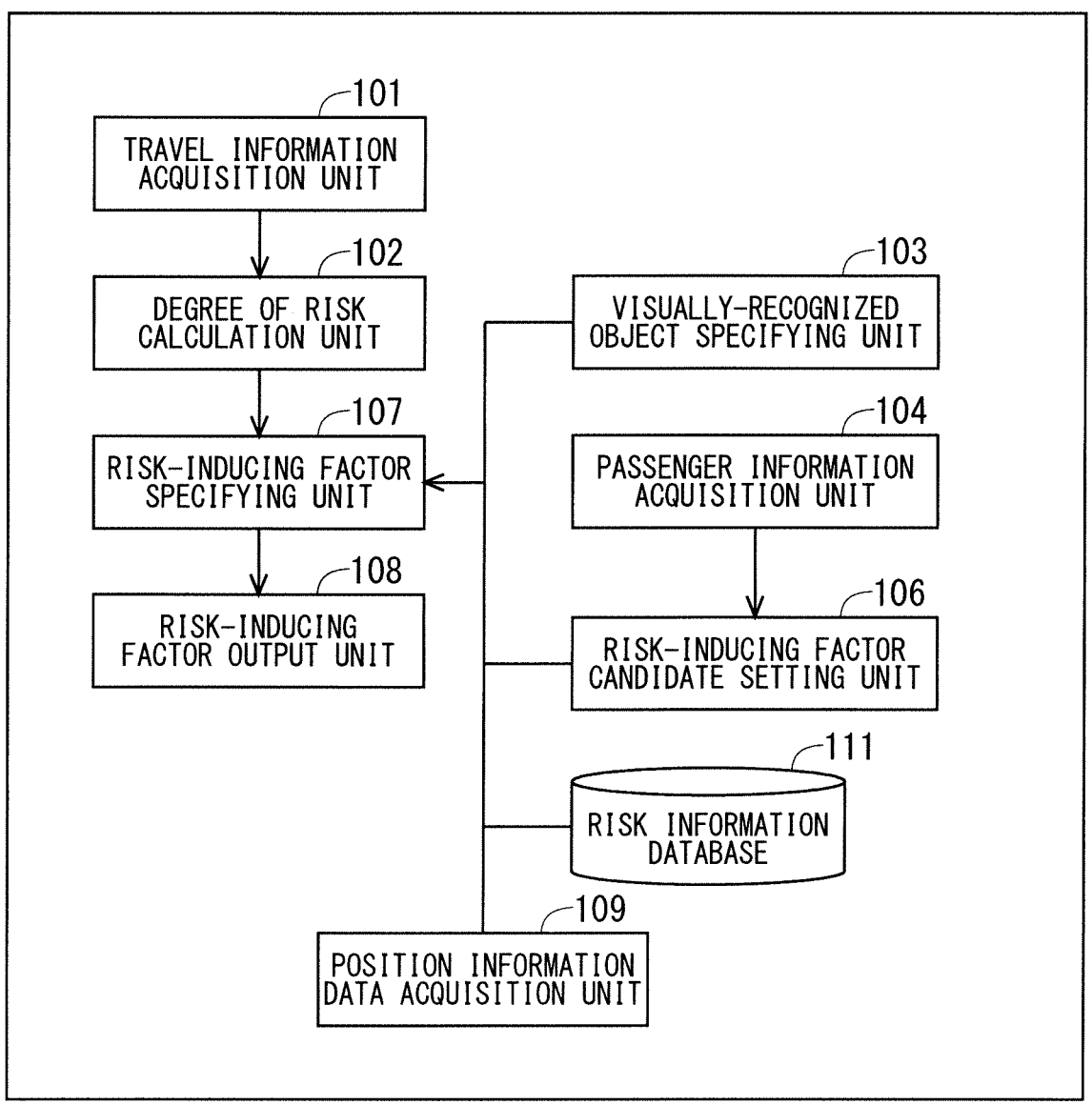
FIG. 16 A function block diagram illustrating a modification example of the configuration of the risk information collection device according to the embodiment 1 of the present invention.

That is to say, a risk information collection device 100A illustrated in FIG. 16 has a configuration that not only the information of the visually-recognized object group being output from the visually-recognized object specifying unit 103 and the information of the risk-inducing factor candidate group being output from the risk-inducing factor candidate setting unit 106 but also current position information being output from the position information data acquisition unit 109 and past risk information being output from the risk information database 111 are input to the risk-inducing factor specifying unit 107.

A risk information collection device 200A illustrated in FIG. 17 has a configuration that not only the information of the visually-recognized object group being output from the visually-recognized object specifying unit 103 and the information of the risk-inducing factor candidate group being output from the risk-inducing factor candidate setting unit 106 but also current position information being output from the position information data acquisition unit 109 and past risk information being output from the risk information database 111 are input to the risk-inducing factor specifying unit 107.

The risk information database 111 is added to the risk information collection device 300 in the embodiment 3, thereby being able to increase the accuracy for specifying the risk-inducing factor.

Figure 18:
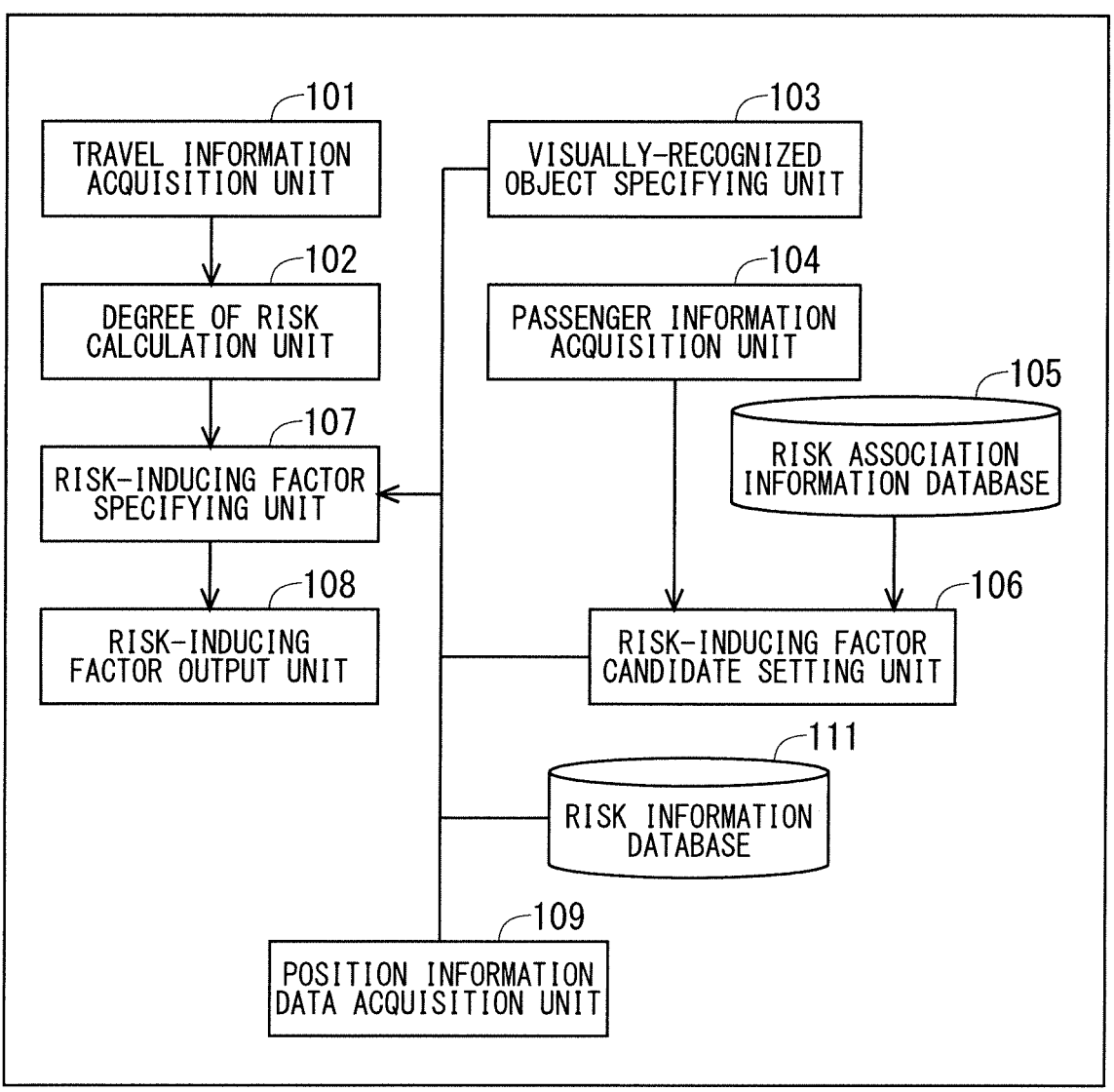
FIG. 18 A function block diagram illustrating a modification example of the configuration of the risk information collection device according to the embodiment 3 of the present invention.

That is to say, a risk information collection device 300A illustrated in FIG. 18 has a configuration that the position information of the subject vehicle acquired in the position information data acquisition unit 109 is input not to the risk-inducing factor output unit 108 but to the risk-inducing factor specifying unit 107, and not only the information of the visually-recognized object group being output from the visually-recognized object specifying unit 103 and the information of the risk-inducing factor candidate group being output from the risk-inducing factor candidate setting unit 106 but also current position information being output from the position information data acquisition unit 109 and past risk information being output from the risk information database 111 are input to the risk-inducing factor specifying unit 107.

In FIG. 16, FIG. 17, and FIG. 18, the same reference numerals will be assigned to the same configuration as the risk information collection devices 100, 200, and 300 described using FIG. 1, FIG. 8, and FIG. 11, and a duplicate description is omitted.

Embodiment 6

Figure 19:
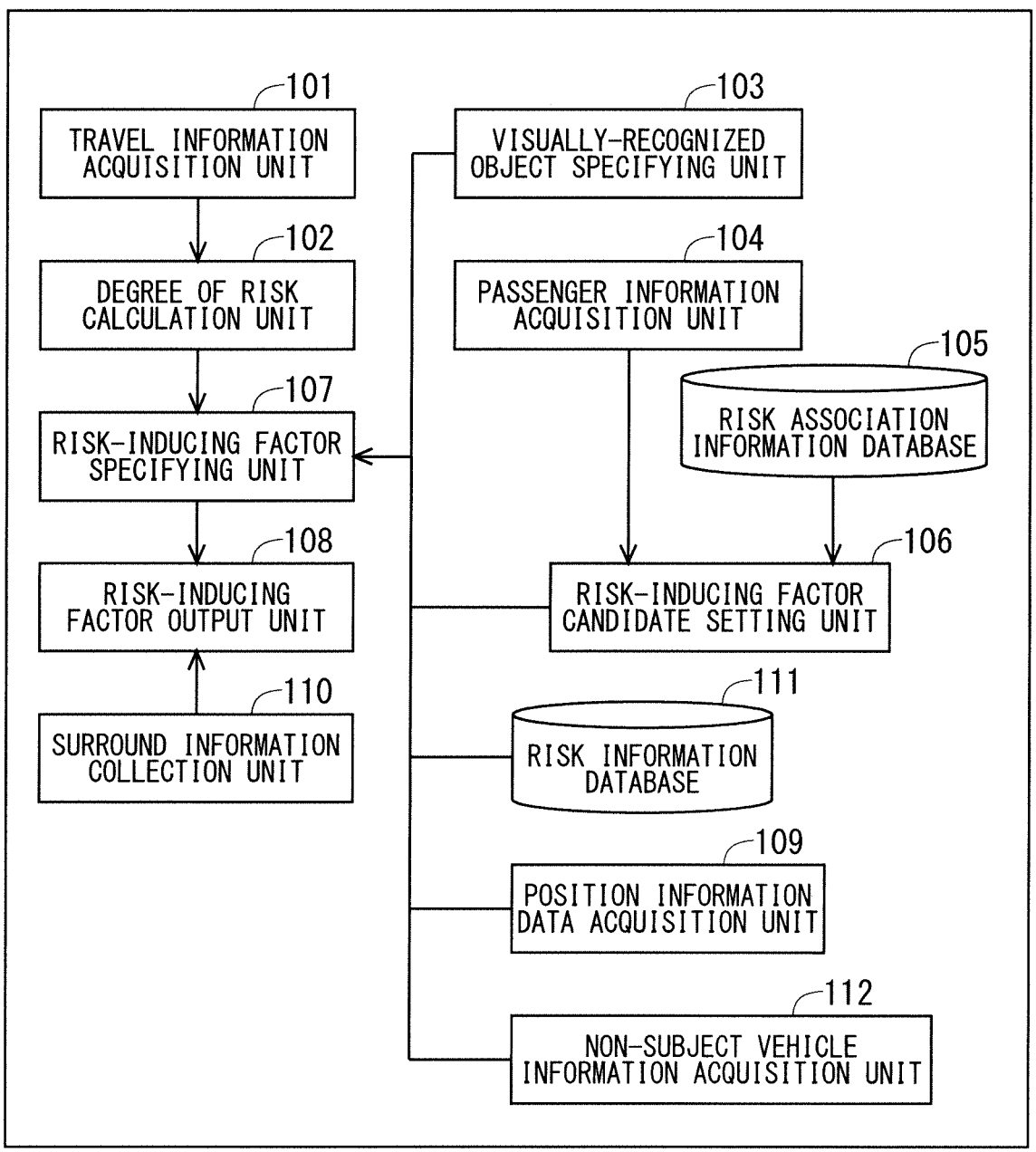
FIG. 19 A function block diagram illustrating a configuration of a risk information collection device according to an embodiment 6 of the present invention.

FIG. 19 is a function block diagram illustrating a configuration of a risk information collection device 600 according to an embodiment 6 of the present invention. The risk information collection device 600 illustrated in FIG. 19 includes a non-subject vehicle information acquisition unit 112 acquiring risk-inducing factor information regarding a non-subject vehicle in addition to the configuration of the risk information collection device 500 according to the embodiment 5 illustrated in FIG. 13. In FIG. 19, the same reference numerals will be assigned to the same configuration as the risk information collection device 500 described using FIG. 13, and a duplicate description is omitted.

As illustrated in FIG. 19, the information of the risk-inducing factor of the non-subject vehicle acquired in the non-subject vehicle information acquisition unit 112 is output to the risk-inducing factor specifying unit 107. The risk-inducing factor specifying unit 107 specifies the risk-inducing factor using the information of the visually-recognized object group being output from the visually-recognized object specifying unit 103, the information of the risk-inducing factor candidate group being output from the risk-inducing factor candidate setting unit 106, the current position information being output from the position information data acquisition unit 109, the past risk information being output from the risk information database 111, and the risk-inducing factor of the non-subject vehicle being output from the non-subject vehicle information acquisition unit 112, and outputs the risk-inducing factor to the risk-inducing factor output unit 108.

Herein, a name of the risk-inducing factor specified in the non-subject vehicle falls under the information of the risk-inducing factor of the non-subject vehicle. The position information at the time of the occurrence of the risk-inducing factor specified in the non-subject vehicle may be added. The non-subject vehicle information acquisition unit 112 may acquire the information of the risk-inducing factor of the non-subject vehicle via a direct communication with a risk information collection device mounted on the non-subject vehicle, or may acquire the information via a cloud server. The risk-inducing factor specified in the non-subject vehicle and being output from the non-subject vehicle information acquisition unit 112 and the position information thereof may be accumulated in the risk information database 111 as the past risk information.

Figure 20:
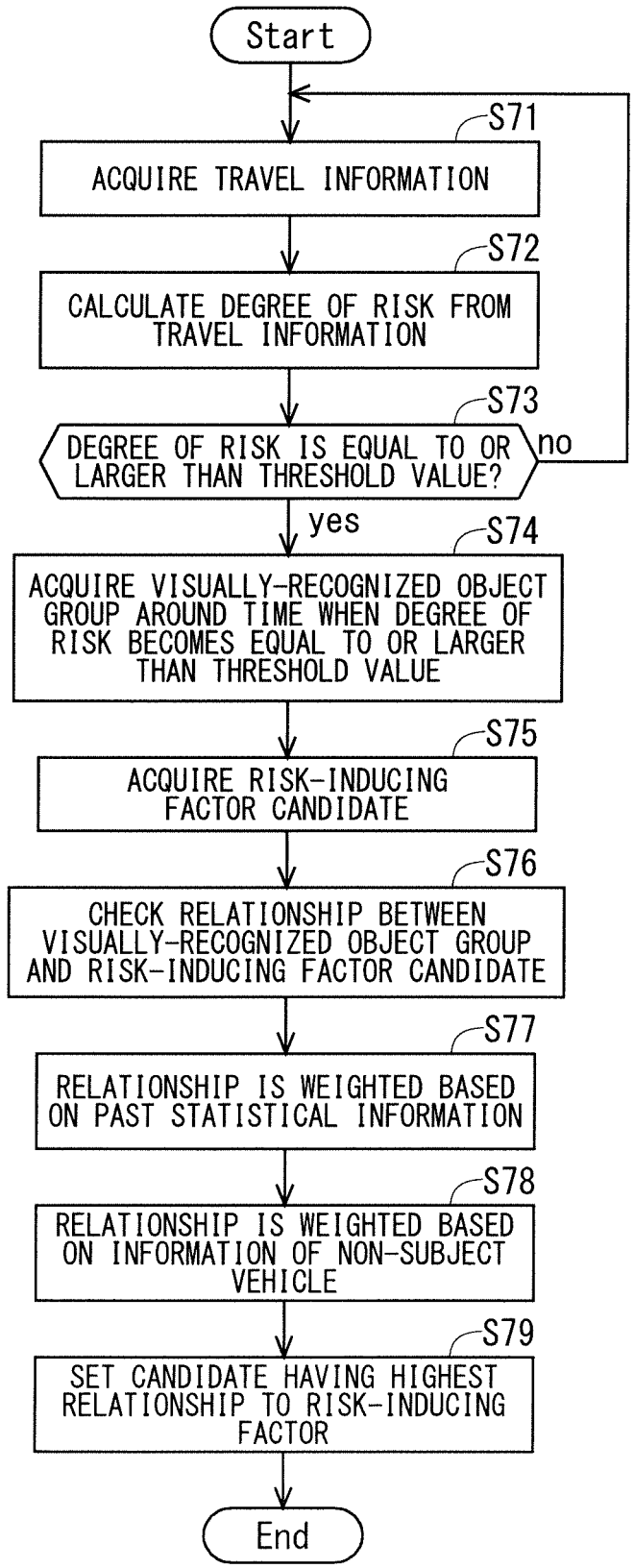
FIG. 20 A flow chart describing operations of a travel information acquisition unit, a degree of risk calculation unit, and a risk-inducing factor specifying unit in the risk information collection device according to the embodiment 6 of the present invention.

FIG. 20 is a flow chart describing an operation of the risk information collection device 600. Processing in Steps S71 to S75 is the same as the processing in Steps S51 to S55 in the flow chart illustrated in FIG. 10. Weighting processing in Step S77 for adding a numeral value to the degree of the relationship based on the risk-inducing factor and the position information which are past statistical information stored in the risk information database 111 after the degree of relationship between the visually-recognized object candidate group and the risk-inducing factor candidate is calculated and the degree of relationship is calculated as the numeral value in Step S76 in the risk-inducing factor specifying unit 107 is the same as that in the embodiment 5. However, further added is weighting processing in Step S78 for adding a numeral value to the degree of relationship based on the risk-inducing factor of the non-subject vehicle being output from the non-subject vehicle information acquisition unit 112.

The non-subject vehicle information acquisition unit 112 acquires the risk-inducing factor of the non-subject vehicle, which is located around the subject vehicle, from the non-subject vehicle. The risk-inducing factor specifying unit 107 checks the relationship between the visually-recognized object candidate group and the risk-inducing factor candidate group from the information of the visually-recognized object group being output from the visually-recognized object specifying unit 103 and the information of the risk-inducing factor candidate group being output from the risk-inducing factor candidate setting unit 107 (Step S76). After checking the relationship, the risk-inducing factor specifying unit 107 searches the information stored in the risk information database 111 to confirm, based on the position information being output from the position information data acquisition unit 109, whether or not there are position information at a point of time when the degree of risk calculated in the degree of risk calculation unit 102 becomes equal to or larger than a threshold value and a risk-inducing factor associated with an area around a position indicated by the position information.

When there is the corresponding risk-inducing factor, information thereof is acquired. The risk-inducing factor specifying unit 107 checks the risk-inducing factor candidate against the past risk-inducing factor which has been acquired, and when the risk-inducing factor candidate coincides with the past risk-inducing factor, a point is added to the degree of relationship of the coinciding risk-inducing factor candidate (Step S77).

The risk-inducing factor specifying unit 107 further acquires the risk-inducing factor of the non-subject vehicle, which is located around the subject vehicle, being output from the non-subject vehicle information acquisition unit 112. The risk-inducing factor specifying unit 107 checks the risk-inducing factor candidate against the risk-inducing factor of the non-subject vehicle which has been acquired, and when the risk-inducing factor candidate coincides with the risk-inducing factor of the non-subject vehicle, a point is added to the degree of relationship of the coinciding risk-inducing factor candidate (Step S78). For example, in a case where there is the word of "cat" in the risk-inducing factor of the non-subject vehicle which has been acquired, the point is added to the degree of relationship of "cat" in the risk-inducing factor candidate when there is "cat" in the risk-inducing factor candidate. The range of the surrounding area of the subject vehicle described above is specified within a radius centering on the subject vehicle, for example, and the radius may be selected from 300 m, 500 m, and 1 km.

The risk-inducing factor specifying unit 107 determines the risk-inducing factor candidate having the highest point of the degree of relationship, including the weighted degree of relationship, to be the risk-inducing factor (Step S79).

As described above, according to the risk information collection device 600 of the embodiment 6 of the present invention, the object inducing the risk can be specifically specified. Thus, the factor which has induced the risk can be specified in addition to the function of specifying the dangerous spot, thus the user can be provided with the information indicating the cause of the risk. The risk information collection device 600 includes the non-subject vehicle information acquisition unit 112, and uses the information of the risk-inducing factor of the non-subject vehicle located around the subject vehicle, thereby being able to further increase the accuracy for specifying the risk-inducing factor.

Modification Example

The non-subject vehicle information acquisition unit 112 is added to the risk information collection devices 100, 200, 300, and 400 according to the embodiments 1 to 4, thereby being able to increase the accuracy for specifying the risk-inducing factor.

That is to say, a risk information collection device 100B illustrated in FIG. 21 has a configuration that not only the information of the visually-recognized object group being output from the visually-recognized object specifying unit 103 and the information of the risk-inducing factor candidate group being output from the risk-inducing factor candidate setting unit 106 but also information of the risk-inducing factor of the non-subject vehicle being output from the non-subject vehicle information acquisition unit 112 are input to the risk-inducing factor specifying unit 107.

Figure 22:
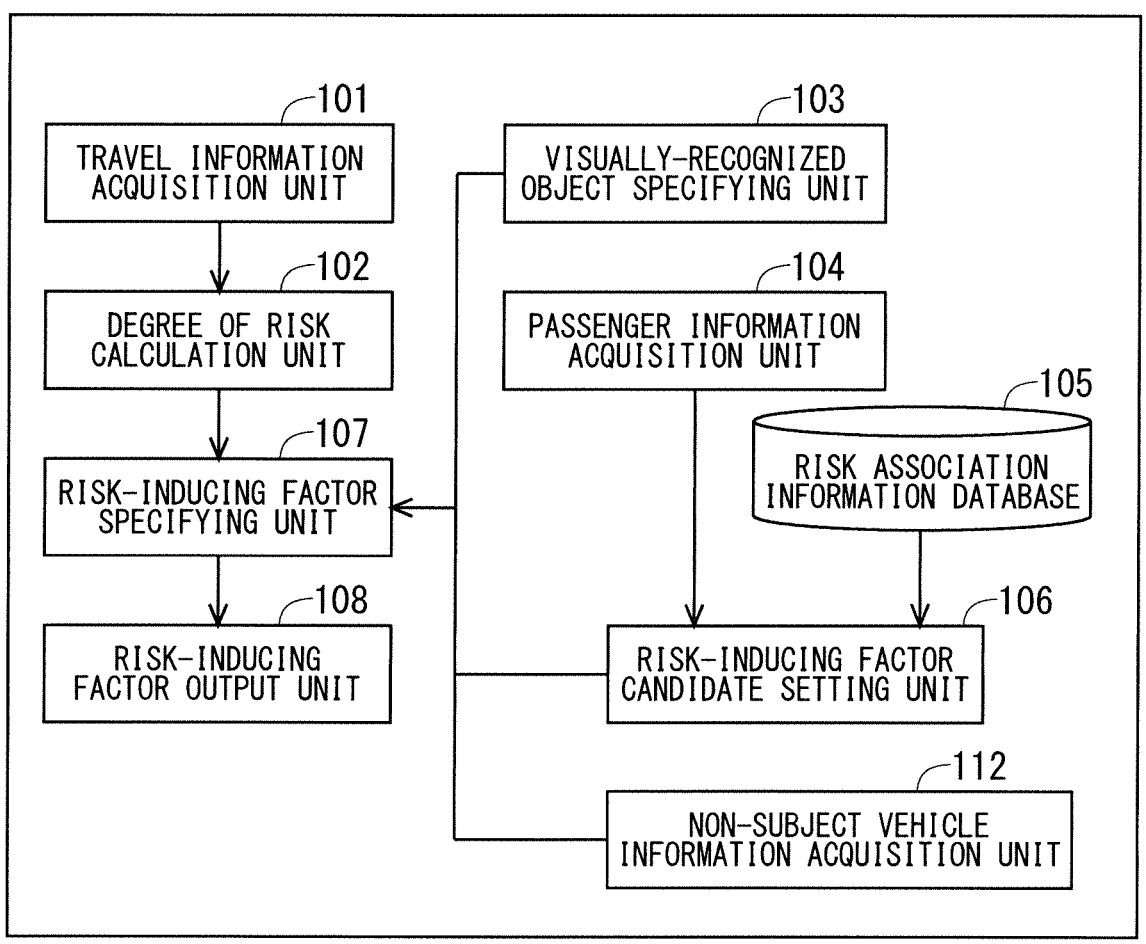
FIG. 22 A function block diagram illustrating a modification example of the configuration of the risk information collection device according to the embodiment 2 of the present invention.

A risk information collection device 200B illustrated in FIG. 22 has a configuration that not only the information of the visually-recognized object group being output from the visually-recognized object specifying unit 103 and the information of the risk-inducing factor candidate group being output from the risk-inducing factor candidate setting unit 106 but also information of the risk-inducing factor of the non-subject vehicle being output from the non-subject vehicle information acquisition unit 112 are input to the risk-inducing factor specifying unit 107.

Figure 23:
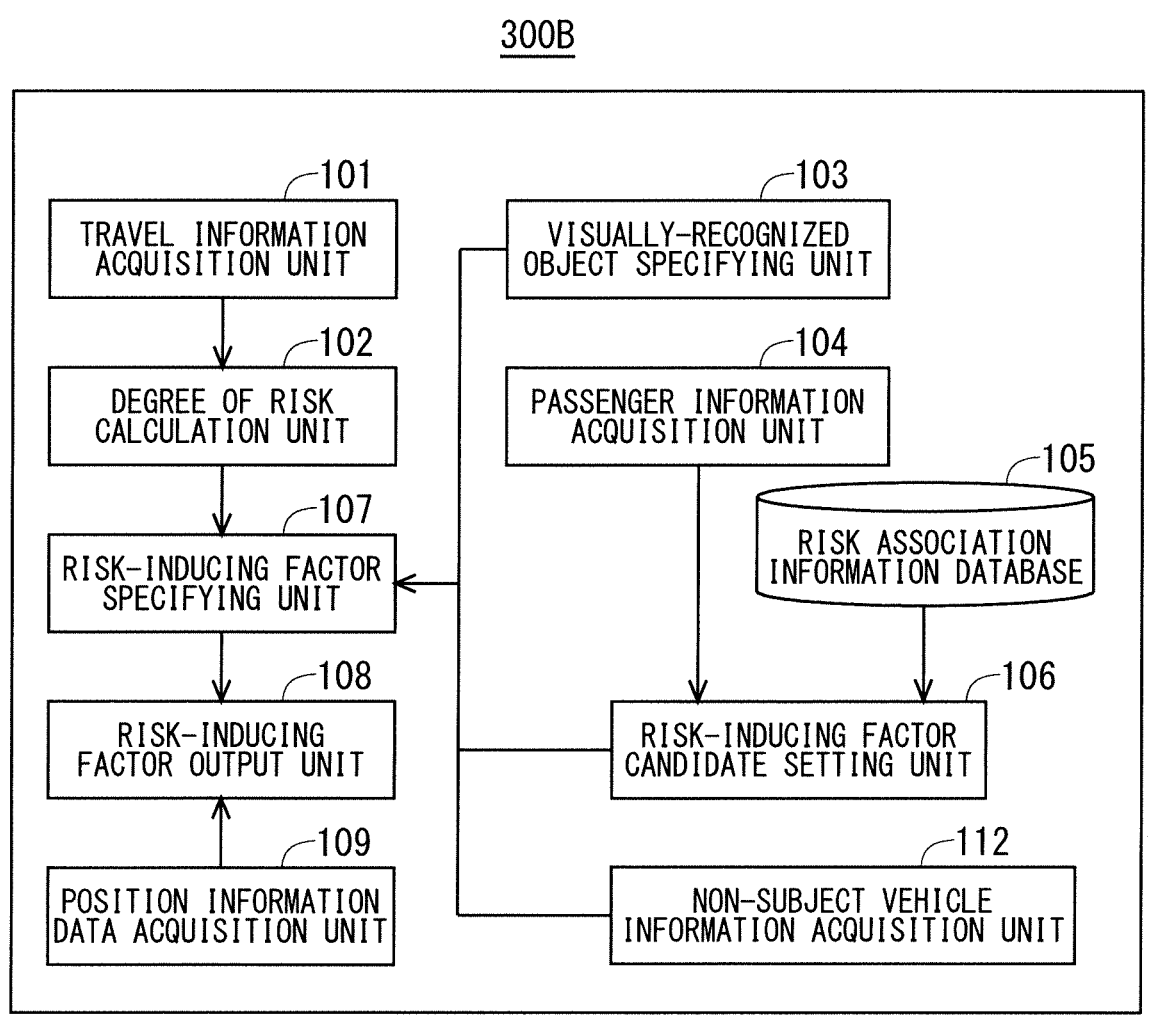
FIG. 23 A function block diagram illustrating a modification example of the configuration of the risk information collection device according to the embodiment 3 of the present invention.

A risk information collection device 300B illustrated in FIG. 23 has a configuration that not only the information of the visually-recognized object group being output from the visually-recognized object specifying unit 103 and the information of the risk-inducing factor candidate group being output from the risk-inducing factor candidate setting unit 106 but also information of the risk-inducing factor of the non-subject vehicle being output from the non-subject vehicle information acquisition unit 112 are input to the risk-inducing factor specifying unit 107.

Figure 24:
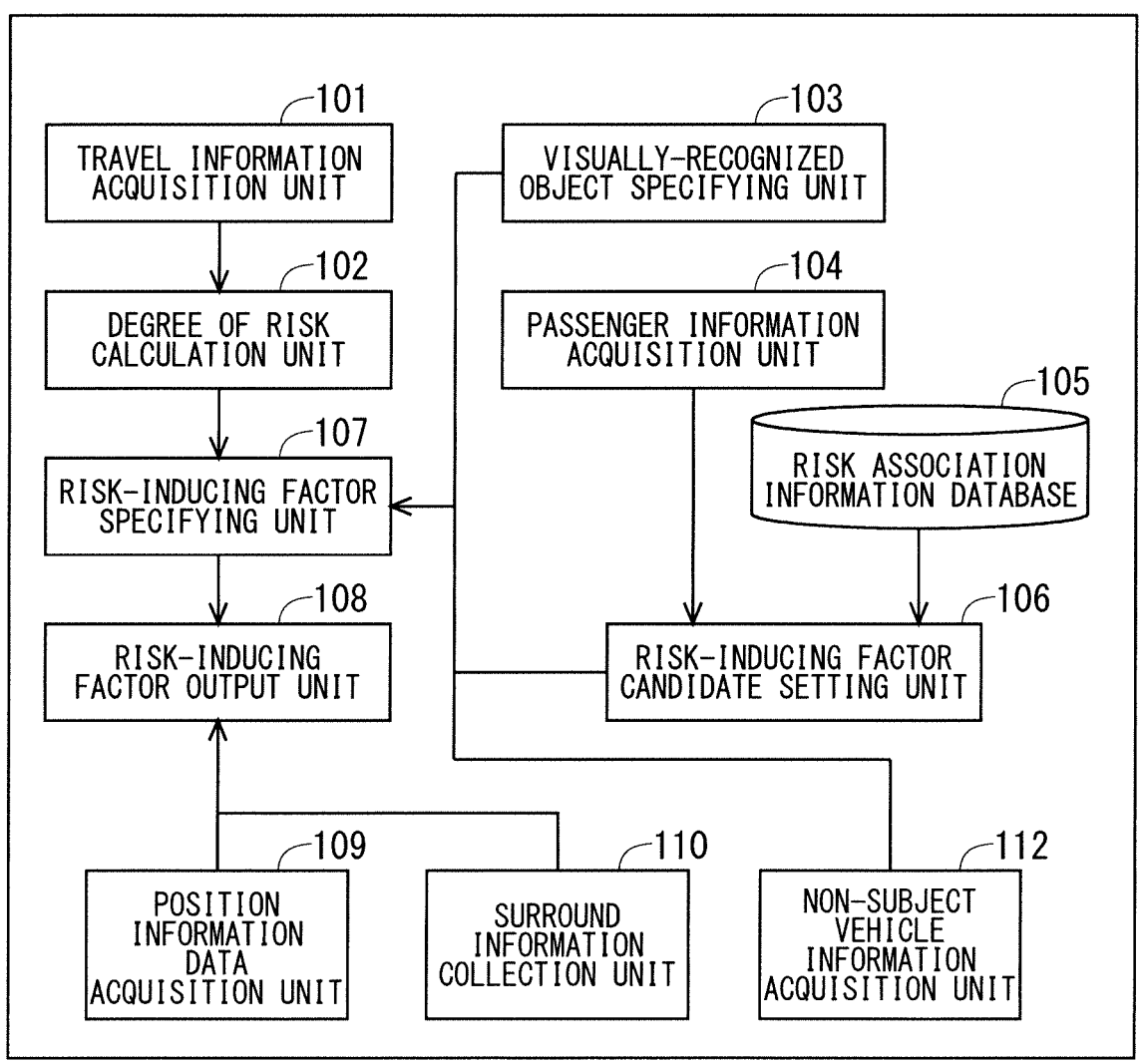
FIG. 24 A function block diagram illustrating a modification example of the configuration of the risk information collection device according to the embodiment 4 of the present invention.

A risk information collection device 400B illustrated in FIG. 24 has a configuration that not only the information of the visually-recognized object group being output from the visually-recognized object specifying unit 103 and the information of the risk-inducing factor candidate group being output from the risk-inducing factor candidate setting unit 106 but also information of the risk-inducing factor of the non-subject vehicle being output from the non-subject vehicle information acquisition unit 112 are input to the risk-inducing factor specifying unit 107.

In FIG. 21 to FIG. 24, the same reference numerals will be assigned to the same configuration as the risk information collection devices 100, 200, 300, and 400 described using FIG. 1, FIG. 8, FIG. 11, and FIG. 12, and a duplicate description is omitted.

The main configurations of the risk information collection devices 100, 200, 300, 400, 500, 600, 100A, 200A, 300A, 100B, 200B, and 300B can be made up using a computer, and each configuration thereof is achieved when the computer executes a program. For example, the travel information acquisition unit 101, the degree of risk calculation unit 102, the visually-recognized object specifying unit 103, the passenger information acquisition unit 104, the risk-inducing factor candidate setting unit 106, the risk-inducing factor specifying unit 107, and the risk-inducing factor output unit 108 in the risk information collection device 100 illustrated in FIG. 1 are achieved by a processing circuit 100 illustrated in FIG. 25. A processor such as a central processing unit (CPU) and a digital signal processor (DSP) is applied to the processing circuit 10, and a function of each configuration described above is achieved by executing a program stored in a storage device.

Dedicated hardware may be applied to the processing circuit 10. When the processing circuit 10 is the dedicated hardware, a single circuit, a complex circuit, a programmed processor, a parallel-programmed processor, an application specific integrated circuit (ASIC), a field programmable gate array (FPGA), or a circuit combining them, for example, falls under the processing circuit 10.

FIG. 26 illustrates, as an example, a hardware configuration in a case where each configuration of the risk information collection device 100 illustrated in FIG. 1 is made up using a processor. In this case, each function of the configuration of the risk information collection device 100 is achieved by a combination of software (software, firmware, or a combination of software and firmware), for example. The software, for example, is described as a program and is stored in a memory 12. A processor 11 functioning as the processing circuit 10 reads out and executes the program stored in the memory 12 (the storage device), thereby achieving the function of each unit.

The present invention has been shown and described in detail, the foregoing description is in all aspects illustrative and not restrictive. It is therefore understood that numerous modifications and variations can be devised without departing from the scope of the invention.

According to the present invention, each embodiment can be arbitrarily combined, or each embodiment can be appropriately varied or omitted within the scope of the invention.

The invention claimed is:

1. A risk information collection device mounted on a vehicle and collecting information dangerous to a traveling of the vehicle, comprising:
a processing circuit, wherein the processing circuit is configured to acquire travel information indicating a travel state of the vehicle;
calculate a degree of risk which is to be an index whether a travel state of the vehicle is in danger based on the travel information acquired in the travel information acquisition processing;
combine visual line information of a driver of the vehicle and object information around the vehicle to specify a visually-recognized object of the driver as a visually-recognized object candidate;
acquire passenger information including words pronounced by a passenger;
set a group of risk-inducing factor candidates including at least one risk-inducing factor candidate as candidates for a risk-inducing factor which has induced a risk based on the acquired passenger information;
select the risk-inducing factor from the at least one risk-inducing factor candidate included in the group of risk-inducing factor candidates based on the calculated degree of risk, the visually-recognized object candidate, and the at least one risk-inducing factor candidate;
check a relationship between the visually-recognized object candidate and the at least one risk-inducing factor candidate when the degree of risk becomes equal to or larger than a threshold value;

further select one of the risk-inducing factor candidates as the risk-inducing factor when the visually-recognized object candidate and the one of the risk-inducing factor candidates are associated with each other; and perform voice analysis on words pronounced by the passenger, divide the words into single words, and set a plurality of the single words, which have been divided, as the at least one risk-inducing factor candidate in the group of risk-inducing factor candidates.

2. The risk information collection device according to claim 1, wherein the passenger information includes video information of a behavior of the passenger, and the processing circuit is further configured to perform video analysis on the behavior of the passenger, and when the behavior of the passenger is a behavior of specifying an object outside the vehicle, the risk to specify the object and to add a word of a name of the object to the risk-inducing factor candidate.

3. The risk information collection device according to claim 1, wherein the travel information includes information of a speed, a presence or absence of a braking operation, an acceleration, and a steering angle, and the processing circuit is further configured to set the degree of risk by a numeral value in multiple stages by combination of the information of the speed, the presence or absence of the braking operation, the acceleration, and the steering angle.

4. The risk information collection device according to claim 2, wherein in checking a relationship between the visually-recognized object candidate and the risk-inducing factor candidate, when a word expressing an object or a word expressing a state of the object in the risk-inducing factor candidate coincides with the visually-recognized object candidate, the processing circuit is further configured to link the visually-recognized object candidate with the risk-inducing factor candidate, and specify the risk-inducing factor candidate as the risk-inducing factor.

5. The risk information collection device according to claim 2, wherein in checking a relationship between the visually-recognized object candidate and the risk-inducing factor candidate, when a word expressing an object or a word expressing a state of the object in the risk-inducing factor candidate coincides with the visually-recognized object candidate, the processing circuit is further configured to link the visually-recognized object candidate with the risk-inducing factor candidate, and when there are a plurality of the risk-inducing factor candidates, the processing circuit is further configured to classify each word in the risk-inducing factor candidates into a word expressing the object, a word expressing a state of the object, and a word expressing a degree of risk, assign a predetermined point to the each word for each classification as an index of a degree of relationship, calculate a sum of the predetermined point for each of the risk-inducing factor candidates, and specify the risk-inducing factor candidate having the highest sum of the predetermined point as the risk-inducing factor.

6. The risk information collection device according to claim 2, further comprising a risk association information database storing information associated with a risk, wherein the processing circuit is further configured to refine the passenger information using the information associated with the risk in setting the risk-inducing factor candidate, the information associated with the risk includes at least a word associated with a risk, and in refining the passenger information, when a plurality of words in the risk-inducing factor candidate include the word associated with the risk in the risk association information database, the processing circuit is further configured to set the word associated with the risk in the risk-inducing factor candidate and words pronounced before and after the word associated with the risk as the risk-inducing factor candidate.

7. The risk information collection device according to claim 2, further comprising a risk information database storing a past risk-inducing factor and position information of the past risk-inducing factor, wherein the processing circuit is further configured to acquire position information of the vehicle, and in checking a relationship between the visually-recognized object candidate and the risk-inducing factor candidate, when the risk information database includes the past risk-inducing factor associated with the position information of the vehicle being acquired at a point of time when the degree of risk becomes equal to or larger than a threshold value and the past risk-inducing factor and the risk-inducing factor candidate coincide with each other, the processing circuit further configured to perform weighting processing on a degree of relationship of the risk-inducing factor candidate coinciding with the past risk-inducing factor.

8. The risk information collection device according to claim 7, wherein the processing circuit is further configured to acquire a risk-inducing factor of a non-subject vehicle, and in checking a relationship between the visually-recognized object candidate and the risk-inducing factor candidate, when the acquired risk-inducing factor of the non-subject vehicle associated with the acquired position information of the vehicle being acquired at the point of time when the degree of risk becomes equal to or larger than the threshold value and the risk-inducing factor candidate coincide with each other, the processing circuit is further configured to perform weighting processing on a degree of relationship of the risk-inducing factor candidate coinciding with the risk-inducing factor.

9. A risk information collection device mounted on a vehicle and collecting information dangerous to a traveling of the vehicle, comprising:

a processing circuit, wherein the processing circuit is configured to acquire travel information indicating a travel state of the vehicle;

calculate a degree of risk which is to be an index whether a travel state of the vehicle is in danger based on the travel information acquired in the travel information acquisition processing;

combine visual line information of a driver of the vehicle and object information around the vehicle to specify a visually-recognized object of the driver to set as a visually-recognized object candidate;

acquire passenger information including at least words pronounced by a passenger;

set at group of risk-inducing factor candidates including at least one risk-inducing factor candidate as candidates for a risk-inducing factor which has induced a risk based on the acquired passenger information;

specify the risk-inducing factor from the at least one risk-inducing factor candidate included in the group of risk-inducing factor candidates based on the calculated degree of risk, the visually-recognized object candidate, and the at least one risk-inducing factor candidate;

acquire position information of the vehicle;

check a relationship between the visually-recognized object candidate and the risk-inducing factor candidate when the degree of risk becomes equal to or larger than a threshold value;

further select one of the risk-inducing factor candidates as the risk-inducing factor when the visually-recognized object candidate and the one of the risk-inducing factor candidates are associated with each other; and output the position information of the vehicle acquired at a point of time when the travel state of the vehicle being in danger has occurred, together with the risk-inducing factor which has been specified.

10. A risk information collection device mounted on a vehicle and collecting information dangerous to a traveling of the vehicle, comprising:

a processing circuit, wherein the processing circuit is configured to acquire travel information indicating a travel state of the vehicle;

calculate a degree of risk which is to be an index whether a travel state of the vehicle is in danger based on the travel information acquired in the travel information acquisition processing;

combine visual line information of a driver of the vehicle and object information around the vehicle to specify a visually-recognized object of the driver as a visually-recognized object candidate;

acquire passenger information including at least words pronounced by a passenger;

set at group of risk inducing factor candidates including at least one risk-inducing factor candidate as candidates for a risk-inducing factor which has induced a risk based on the acquired passenger information;

select the risk-inducing factor from the at least one risk-inducing factor candidate included in the group of risk-inducing factor candidates based on the calculated degree of risk, the visually-recognized object candidate, and the at least one risk-inducing factor candidate; and collect surround information including a congestion degree of vehicle and a congestion degree of people around the vehicle;

check a relationship between the visually-recognized object candidate and the risk-inducing factor candidate when the degree of risk becomes equal to or larger than a threshold value;

further select one of the risk-inducing factor candidates as the risk-inducing factor when the visually-recognized object candidate and the one of the risk-inducing factor candidates are associated with each other; and output the surround information being acquired in a position where the travel state of the vehicle being in danger has occurred, together with the risk-inducing factor which has been specified.

* * * * *